(12) United States Patent
Ciochina-Kar et al.

(10) Patent No.: US 12,744,571 B2
(45) Date of Patent: Sep. 22, 2026

(54) COMMUNICATION DEVICES AND METHODS

(71) Applicant: Sony Group Corporation, Tokyo (JP)

(72) Inventors: Dana Ciochina-Kar, Stuttgart (DE); Thomas Handte, Stuttgart (DE); Daniel Verenzuela, Stuttgart (DE); Gianmarco Zonta, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 62 days.

(21) Appl. No.: 18/837,209

(22) PCT Filed: Feb. 21, 2023

(86) PCT No.: PCT/EP2023/054293

§ 371 (c)(1), (2) Date: Aug. 9, 2024

(87) PCT Pub. No.: WO2023/156678

PCT Pub. Date: Aug. 24, 2023

(65) Prior Publication Data

US 2025/0192837 A1 Jun. 12, 2025

(30) Foreign Application Priority Data

Feb. 21, 2022 (EP) .................................... 22157754

(51) Int. Cl.

| | |
|---|---|
| ***H04B 7/06*** | (2006.01) |
| ***H04B 7/024*** | (2017.01) |
| ***H04L 5/00*** | (2006.01) |
| ***H04L 25/02*** | (2006.01) |

(52) U.S. Cl.

CPC .......... *H04B 7/0617* (2013.01); *H04B 7/024* (2013.01); *H04L 5/0044* (2013.01); *H04L 25/0248* (2013.01)

(58) Field of Classification Search

CPC ..... H04B 7/0617; H04B 7/024; H04L 5/0044; H04L 25/0284

See application file for complete search history.

(56) References Cited

U.S. PATENT DOCUMENTS

| | | | |
|---|---|---|---|
| 2016/0100396 | A1 | 4/2016 | Seok |
| 2018/0248592 | A1 | 8/2018 | Ashrafi |
| 2019/0007967 | A1 | 1/2019 | Zhang et al. |
| 2020/0145157 | A1 | 5/2020 | Suh et al. |
| 2020/0280345 | A1 | 9/2020 | Schelstraete |

(Continued)

OTHER PUBLICATIONS

IEEE, "Part 11: Wireless LAN Medium Access Control (MAC) and Physical Layer (PHY) Specifications", LAN/MAN Standards Committee of the IEEE Computer Society, IEEE Std 802.11™-2016, Dec. 7, 2016, 3534 pages.

(Continued)

*Primary Examiner* — Janice N Tieu

(74) *Attorney, Agent, or Firm* — XSENSUS LLP

(57) ABSTRACT

Two access points AP1 and oAP1 are within overlapping basic service sets and engage in partially or fully overlapped downlink transmissions towards respective associated station(s) STA1, oSTA1. At the same time the interference towards the other stations involved in the coordinated communication scheme is controlled and suppressed/reduced.

20 Claims, 13 Drawing Sheets

(56) References Cited

U.S. PATENT DOCUMENTS

| | | | | |
|---|---|---|---|---|
| 2021/0307069 | A1 | 9/2021 | Xin et al. | |
| 2022/0052764 | A1* | 2/2022 | Medra | H04B 10/614 |
| 2023/0138096 | A1* | 5/2023 | Zhao | H04W 74/0816 370/329 |
| 2024/0187041 | A1* | 6/2024 | Elshafie | H04B 7/06952 |
| 2024/0284413 | A1* | 8/2024 | Wang | H04W 72/20 |

OTHER PUBLICATIONS

Sigurd Schelstraete (Quantenna Communications): "Nulling and coordinated beamforming", doc.: IEEE 802.11-19/0445, Mar. 11, 2019, pp. 1-11.
"Part 11: Wireless LAN Medium Access Control (MAC) and Physical Layer (PHY) Specifications Amendment 1: Enhancements for High Efficiency WLAN", IEEE P802.11ax™/D6.0, Nov. 2019, pp. 1-780.
"Part 11: Wireless LAN Medium Access Control (MAC) and Physical Layer (PHY) Specifications Amendment 8: Enhancements for extremely high throughput (EHT)", IEEE P802.11be™/D1.0, May 2021, pp. 1-635.
International Search Report and Written Opinion mailed on Jun. 26, 2023, received for PCT Application PCT/EP2023/054293, filed on Feb. 21, 2023, 17 pages.

* cited by examiner

COMMUNICATION DEVICES AND METHODS

CROSS-REFERENCE TO RELATED APPLICATIONS

The present application is based on PCT filing PCT/EP2023/054293, filed Feb. 21, 2023, which claims priority from European Patent Application No. 22157754.7, filed Feb. 21, 2022, the entire contents of each are incorporated herein by reference.

BACKGROUND

Field of the Disclosure

The present disclosure relates to communication devices and method, in particular for use with coordinated beamforming.

Description of Related Art

Enhanced Spatial Reuse by utilizing beamforming techniques to manage interference and increase spectral efficiency has been discussed in academia and is currently being considered in the recent draft amendment of the IEEE 802.11 standards P802.11TGbe and beyond.

Different coordination and beamforming techniques have been so far proposed, among them joint transmission and coordinated beamforming. The latter is easier to implement as the access points (APs) involved are handling the data transmissions independently after an initial coordination and training phase has been set up. Implementing coordinated beamforming in the WLAN context comes, however, with several problems including the problem of residual interference occurring due to legacy constraints and the format of the transmission packets.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to overcome or at least reduce the problems of using coordinated beamforming in the WLAN context, in particular to reduce residual interference.

According to an aspect there is provided a first communication device configured to communicate with one or more third communication devices, the first communication device comprising circuitry configured to transmit first configuration information including first beamforming configuration information and first time information indicating the duration of an intended transmission of one or more data units, to which the first configuration information applies, from the first communication device to one or more third communication devices and/or the maximum duration of simultaneous transmissions of data units by the first communication device and a second communication device that is configured to communicate with one or more fourth communication devices;

listen for reception of second configuration information from the second communication device, the second configuration information including second beamforming configuration information and second time information indicating the duration of an intended transmission of one or more data units, to which the second configuration information applies, to one or more fourth communication devices; and communicate with the one or more third communication devices using the first configuration information and, if received, considering the second configuration information using coordinated beamforming, wherein the communication includes to transmit a first data unit, comprising a preamble and a payload, to a third communication device, wherein beamforming weights are used for transmitting both the preamble and the payload of the first data unit that reduce or minimize interference towards a fourth communication device.

According to a further aspect there is provided a second communication device configured to communicate with one or more fourth communication devices, the second communication device comprising circuitry configured to receive first configuration information from a first communication device that is configured to communicate with one or more third communication devices, the first configuration information including first beamforming configuration information and first time information indicating the duration of an intended transmission of one or more data units, to which the first configuration information applies, from the first communication device to one or more third communication devices or the maximum duration of simultaneous transmissions of data units by the first communication device and the second communication device;

transmit second configuration information including second beamforming configuration information and second time information indicating the duration of an intended transmission of one or more data units, to which the second configuration information applies, to one or more fourth communication devices; and communicate with the one or more fourth communication devices using the second configuration information and considering the first configuration information using coordinated beamforming, wherein the communication includes to transmit a second data unit, comprising a preamble and a payload, to a fourth communication device, wherein beamforming weights are used for transmitting both the preamble and the payload of the second data unit that reduce or minimize interference towards a third communication device to which the first communication device transmits a first data unit at least partly overlapping in time with the transmission of the second data unit from the second communication device to the fourth communication device.

According to a further aspect there is provided a third communication device configured to communicate with a first communication device, the third communication device comprisesing circuitry configured to receive first configuration information including first beamforming configuration information and first time information indicating the duration of an intended transmission of one or more data units, to which the first configuration information applies, from the first communication device to the third communication device and/or the maximum duration of simultaneous transmissions of data units by the first communication device and a second communication device that is configured to communicate with one or more fourth communication devices;

communicate with the first communication device, wherein the communication includes to receive a first data unit, comprising a preamble and a payload, transmitted from the first communication device, wherein beamforming weights are used for transmitting both the preamble and the payload of the first data unit; and decode the received first data unit using the first configuration information.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication devices, the disclosed communication methods, the disclosed computer program and the disclosed computer-readable recording medium have similar and/or identical further embodiments as the claimed communication devices and as defined in the dependent claims and/or disclosed herein.

One of the aspects of the disclosure is to enable two APs (the first and second communication devices) with overlapping basic service sets (OBSSs) to engage in partially or fully overlapped downlink transmissions towards associated stations (STAs; the third and fourth communication devices), while at the same time controlling the interference towards the other stations involved in the coordinated communication scheme. To resolve or lessen the problem of residual interference occurring due to the legacy constraints and the format of the transmission packets, protocol and frame changes are presented according to embodiments that allow transmissions with preambles on which interference nulling beamforming schemes are applied, while ensuring that the stations on the medium can correctly obtain the necessary information from the beamformed preambles of data units (also called packets).

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
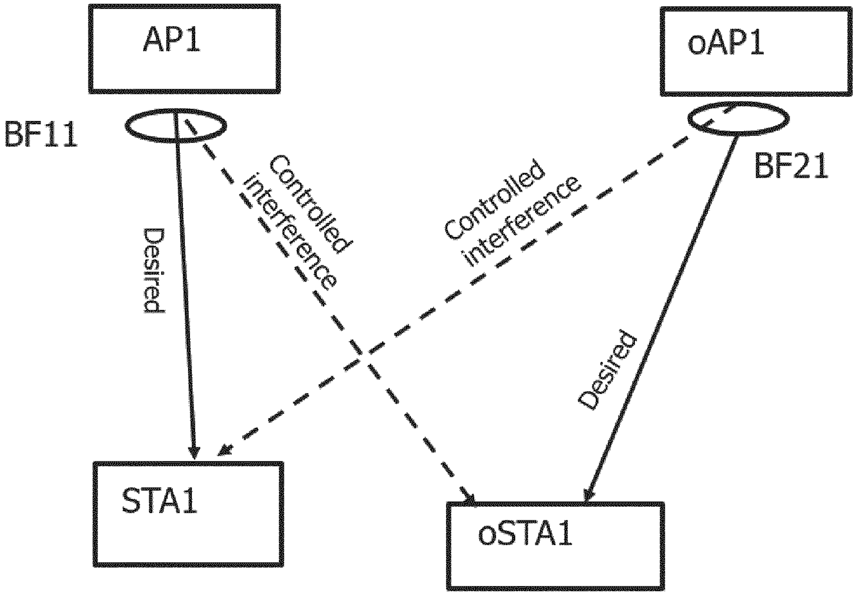
FIG. 1 shows a schematic diagram illustrating a simple example of a coordinated beamforming scenario.

Referring now to the drawings, wherein like reference numerals designate identical or corresponding parts throughout the several views, FIG. 1 shows a schematic diagram illustrating a simple example of a coordinated beamforming scenario. Two access points (APs), AP1 (herein also called first communication device) and oAP1 (overlapping AP; herein also called second communication device), each serve one associated station (STA), STA1 (herein also called third communication device) served by AP1 and oSTA1 (overlapping station; herein also called fourth communication device) served by oAP1. The downlink (DL) transmissions (i.e. data flow from AP to STA, indicated by solid line) of the two APs to the respective stations are partly or fully overlapped in time. To reduce the interference that would be produced at the respective other STA (indicated by dashed lines in FIG. 1) each AP is using a beamforming technique further referred as interference nulling.

Interference nulling includes determining and using beamforming weights (indicated by BF11 and BF22 in FIG. 1) at the transmitter such that the desired transmission towards the intended STA can be performed with a desired quality of service, whereas the interference towards a set of protected STAs is minimized or kept below a threshold. These beamforming weights (or a corresponding beamforming matrix or shaping matrix) may e.g. have been determined before, e.g. in a beamforming training or a beamforming sounding phase.

Implementing the coordinated beamforming in the WLAN context comes, however, with several problems.

Respecting the current format of data units (e.g. physical layer protocol data unit (PPDU) format) and applying the beamforming as currently allowed in the standard can lead to large error rates, depending on how the transmission is performed.

Figure 2A:
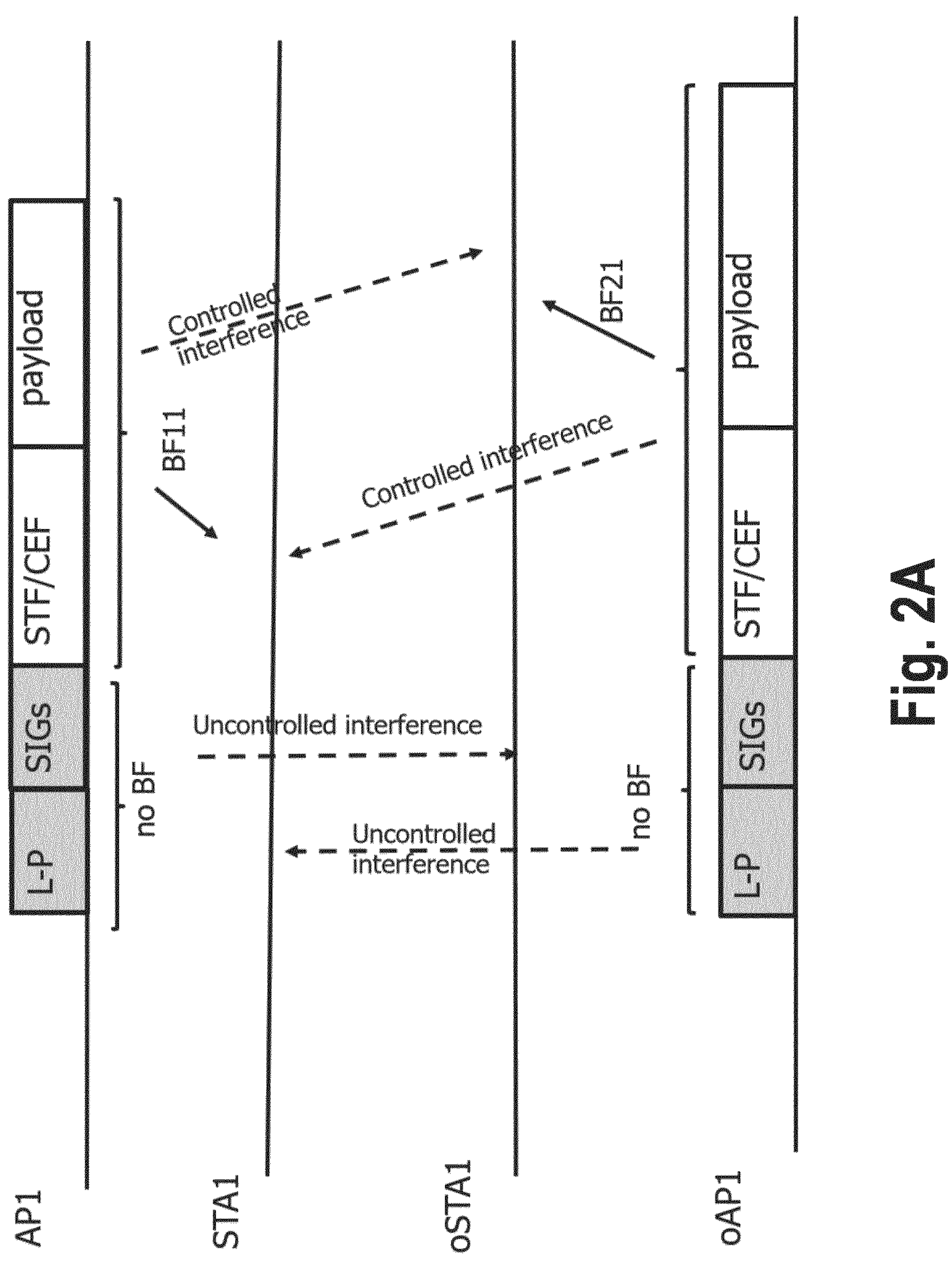
FIG. 2A shows a diagram of a communication scenario with simultaneous transmission of a PPDU having a preamble and a payload.

FIG. 2A shows a diagram of a communication scenario with simultaneous transmission of a PPDU having a preamble (including a legacy preamble portion (L-P), a signaling portion (SIG) and a short training field and channel estimation field (STF/CEF)) and a payload.

The L-P portion is understood by all IEEE802.11 compliant devices and is necessary for backwards compatibility. It contains training fields to enable packet detection, synchronization and initial channel estimation, and signaling fields to indicate basic information like the duration of the PPDU so that other stations know for how long the channel will be occupied. In standard operation, this field is not beamformed.

The SIG portion includes more comprehensive signaling information that is understandable by the newer generation devices compliant with e.g. IEEE802.11ax and 802.11be. It contains information about bandwidth, TXOP duration, MCS, number of spatial streams, etc. This is important information for stations involved in the communication to be able to decode the following data field of the PPDU. It is also important for other stations to know more about the channel usage. In standard operation, this field is not beamformed.

The STF and CEF fields enable fine synchronization and channel estimation to properly decode the data field. In standard operation, when beamforming is applied, these fields and the data field (payload portion) are both beamformed with the same weights.

If both APs are starting the transmission to their corresponding STAs at the same time, as illustrated in FIG. 2A, a header error rate of around 25% can be observed, despite the interference nulling effect of the applied beamforming techniques, which is conventionally not applied for the header (including the L-P portion and the SIG portion), but only for the payload and the STF/CEF portion. This error rate means that around 25% of the PPDUs end up requiring retransmission, because any residual error in the PPDU header causes the PPDU to be wrongly decoded. In this context, a header error refers to the case when the information in the signaling fields of the preamble cannot be decoded, and without this information the STAs cannot decode the data field, i.e., the PPDU is substantially lost.

Figure 2B:
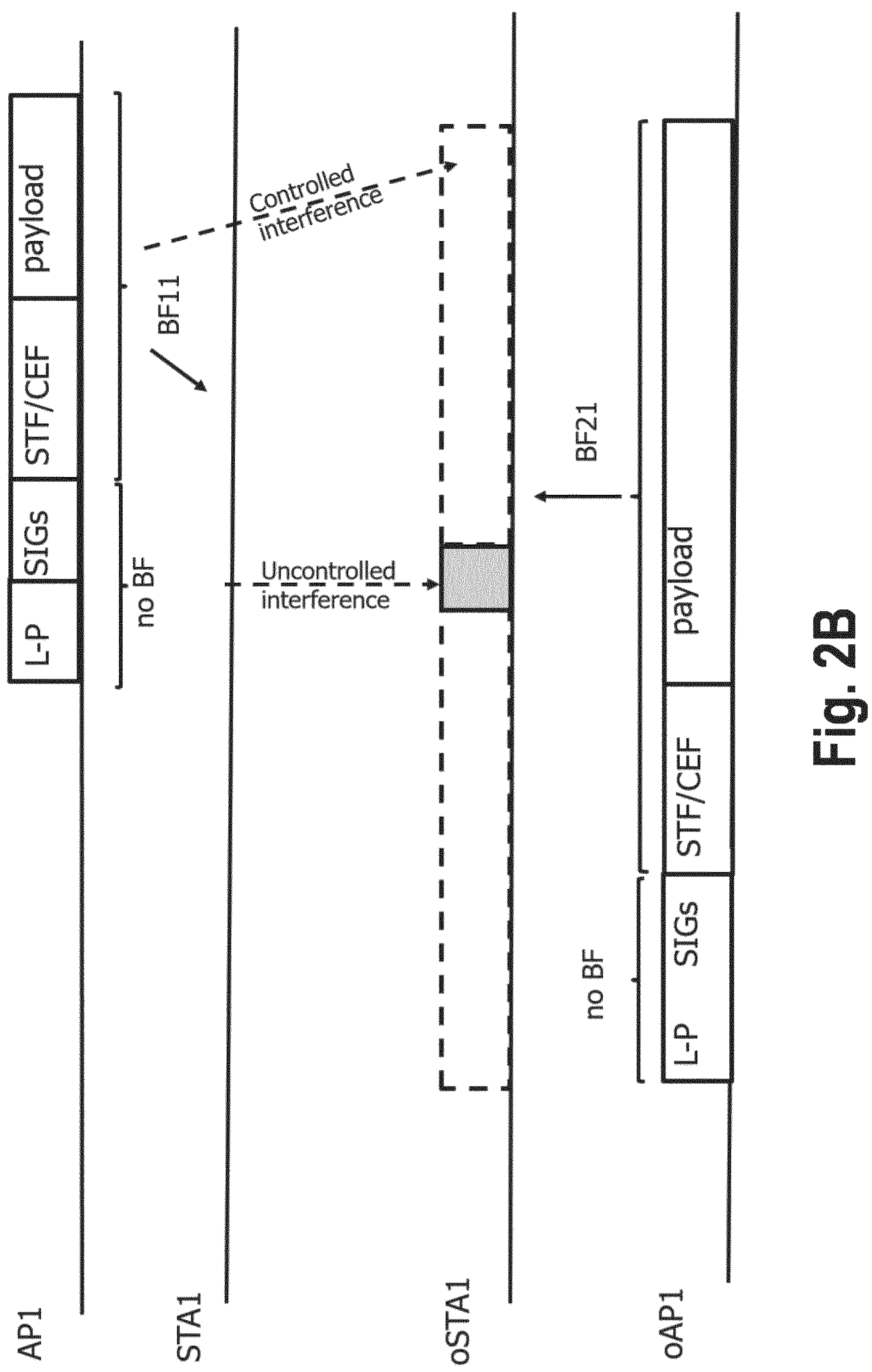
FIG. 2B shows a diagram of a communication scenario with only partly overlapping transmissions.

On the other hand, if one of the APs starts its transmission at a later point in time than the other one, particularly after the preamble of the first transmission (in this example of the oAP1) has been already sent, as illustrated in FIG. 2B showing a diagram of a communication scenario with only partly overlapping transmissions, then large packet error rates, in the range of 50% within the payload, can be expected starting from the point in time when the delayed overlapped transmission begins.

Main culprit for these errors is the PPDU format, which contains in the beginning a header (in the examples shown in FIGS. 2A and 2B the header including the L-P portion and the SIG portion) that must be understood by all STAs listening to the medium. Due to this constraint, this part is usually not being sent with beamforming applied (as indicated in FIGS. 2A and 2B), unless in the very particular case of single user transmission (SU) according to IEEE 802.11ax. The difficulty in beamforming the preambles is that they are carrying the control information necessary for STAs to correctly decode the packets such as length of the PPDU (necessary for all STAs listening to the medium and especially for legacy STAs to infer the duration for which the medium is occupied and channel access shall not be attempted), beamforming configuration (e.g. the number of spatial streams used, information which is contained in the SIG fields immediately preceding the channel estimation sequences), indications about bandwidth, resource allocation, user IDs, etc.

However, applying interference nulling in the preambles, particularly in the header, seems an efficient way of implementing coordinated beamforming and avoiding large overheads for coordination. For this reason, the present disclosure presents methods to enable at least one of the APs to apply beamforming on the (entire) preambles, including header, while ensuring that the intended recipients of the PPDUs can correctly decode these and the unintended recipients can determine the necessary information for correct channel access. The technique of applying beamforming on the entire preambles will herein also be called preamble mapping (PM).

For the subsequent explanation, a coordinated beamforming scenario is considered in which one AP (AP1) communicates with one STA (STA1) at a time while nulling one or more oSTAs (OSTA1). Further, an oAP (oAP1) transmits to the one or more oSTAs, one at a time, while nulling the one or more STAs, while the transmissions between the AP to STAs and oAP to oSTA are partly or fully overlapped in time. In practical scenarios, each AP may communicate with more than one STA, and there may be more than two APs.

This disclosure presents communication devices and methods for a coordinated beamforming (CBF) transmission, which minimize the error probability due to preamble interference (particularly header interference) while ensuring that there is a correct distribution of channel occupancy information to the unintended STAs i.e., the unintended STAs are able to decode the length and/or duration of the following transmission. Furthermore, a correct control distribution to the intended STAs is provided.

One element of an embodiment of the presented CBF solution is that at least one of the APs will send as part of the CBF transmission one or more PPDUs with spatial mapping, e.g., interference nulling beamforming, applied on entire preambles, where the configuration used within the respective PPDUs is implicitly or explicitly announced within the immediately preceding DL PPDU from the transmitting AP STA. Two main cases may be distinguished, depending on the channel occupancy, meaning if both APs can start the beamformed transmissions at the same time or not.

Figure 3:
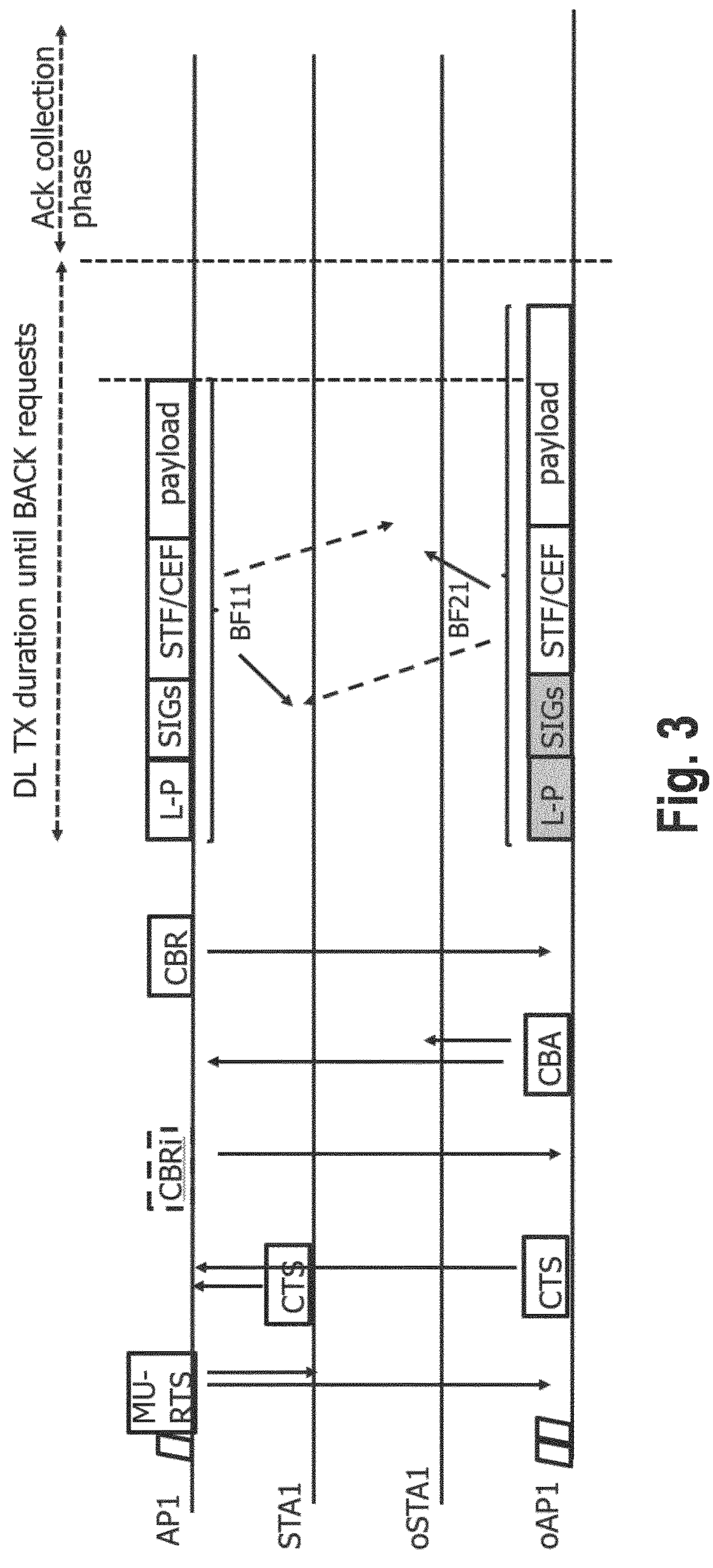
FIG. 3 shows a diagram of an embodiment of a communication scenario according to the present disclosure using coordinated beamforming transmit opportunity.

In a first case, both APs can start transmitting at the same time, i.e., channel occupancy allows this. FIG. 3 shows a diagram of a corresponding embodiment of a communication scenario according to the present disclosure using coordinated beamforming transmit opportunity (TXOP) with both APs. Both APs apply beamforming on the header.

Initially, AP1 and oAP1 are contending for the medium to start a transmission to STA1 and oSTA1, respectively. Assuming that AP1 wins the contention phase, during the TXOP initiation AP1 may announce that the transmission within the following TXOP can be performed with coordinated beamforming, e.g. by a multi-user ready-to-send (MU-RTS) transmission or any other appropriate announcement as separate frame or data unit or as part of another frame or data unit. An identifier, e.g. an association identifier (AID), of the STAs for which a coordinated beamforming stage is possible is announced, e.g., in the MU-RTS. If the oAP1 has data for at least one oSTA, for which a previous coordinated beamforming training or sounding phase has been performed and for which the training or sounding phase has revealed that it can be served simultaneously with the announced STAs, then the AP may respond to the initial announcement, e.g. the MU-RTS, by a corresponding response, e.g. a clear-to-send (CTS) transmission. The STA1 may respond to the initial announcement as well, e.g. by a separate CTS transmission.

In order to make it possible for the two APs to send simultaneously to their respective users using coordinated beamforming, part of the information (herein also called configuration information) that would otherwise be within the header is at least partially announced beforehand. In the embodiment shown in FIG. 3, second configuration information including the configuration of the preamble of the PPDU sent from oAP1 to the oSTA1 is announced, e.g. within a frame herein called CBA (coordinated beamforming announcement) frame. This ensures that oSTA1 can decode the respective transmission. Similarly, second configuration information including part of the configuration of the preamble of the PPDU sent from AP1 to STA1 is announced, e.g. within a frame herein called CBR (coordinated beamforming response) frame. For example, information such as the number of spatial streams with which the coordinated PPDU will be sent may be included within these frames. Furthermore, information may be included regarding the length of the following beamformed PPDU or duration of the downlink transmission or an indication regarding the time when an acknowledgment will be requested.

The length of the beamformed PPDU or duration of the DL transmission may be sent to allow the two APs to organize the UL transmissions for e.g. for the acknowledgment phase. This is because of the assumption that UL transmissions are not nulled, i.e., neither the UL transmission between STA1 to AP1 with the UL transmission between oSTA1 to oAP1, nor the UL transmission with the DL transmission of the other basic service set (BSS).

For STAs other than the STA1 and oSTA1, information regarding the length of the following PPDU duration can be included within the CBA and CBR, respectively, for instance as a spoofed length covering the next duration or simply as signaling information.

When the channel state information (CSI) based on which the beamformers are computed is getting outdated, i.e., when the duration between the sounding and the actual data transmission is longer than a certain threshold, then the nulling effect reduces which makes the transmissions prone to producing mutual interference.

The CBA/CBR frame exchange can be preceded by one transmission from the AP1 of a frame, e.g. as CBRi frame. It is beneficial for the AP1 to start the frame exchange after receiving the CTSs, because otherwise the following problem may arise: a STA not hearing the CTS is allowed to transmit within a timeout after receiving the RTS as it can assume the intended STA had the channel busy. Therefore, if the period of inactivity of the AP1 is larger than the respective timeout interval, STAs may falsely assume TXOP establishment was not successful, start transmitting and create collisions. On the other hand, after responding with a CTS, the oAP1 already distributes the NAV and may itself start a transmission towards AP1, announcing the participation in the CBF and the beamforming information it would use. This can lead to less overhead than the scheme with CBRi, however at the price of lower reliability.

After the exchange of the first and second configuration information (in this example included in the CBA and CBR frames), AP1 and oAP1 simultaneously start transmitting to STA1 and oSTA1, respectively, using coordinated beamforming. Hereby, AP1 uses the first configuration information and, if received from oAP1, considers the second configuration information. PPDUs may thus be simultaneously transmitted using interference nulling, wherein beamforming weights (or a corresponding beamforming matrix or shaping matrix) are used for transmitting both the preamble and the payload of the PPDU that reduce or minimize interference towards oSTA1 to which oAP1 transmits or intends to transmit. Quite similar, oAP1 uses the second configuration information and considers the first configuration information using coordinated beamforming.

The first configuration information includes thus first beamforming configuration information and first time information indicating the duration of an intended transmission of one or more data units, to which the first configuration information applies, from AP1 to one or more STA(s) and/or the maximum duration of simultaneous transmissions of data units by AP1 and oAP1 that communicates (or intends to communicate) with one or more OSTA(s).

The second configuration information thus includes second beamforming configuration information and second time information indicating the duration of an intended transmission of one or more data units, to which the second configuration information applies, from oAP1 to one or more oSTAs.

Generally, the first beamforming configuration information comprises one or more of:

- the number of spatial streams used by AP1 for transmitting the first data unit to STA1,
- identification information indicating one or more STA(s) with which AP1 intends to communicate during the current transmit opportunity and/or indicating one or more pairs of STAs and oSTAs that can be served simultaneously by the AP1 and oAP1, and
- the maximum number of degrees of freedom, including spatial dimensions and/or spatial streams and/or space time streams, that can be used by oAP1 for serving the one or more oSTA(s) simultaneously with the transmission from AP1 to STA1.

The second beamforming configuration information generally comprises one or more of:

- the number of spatial streams used by oAP1 for transmitting the second data unit to oSTA1, identification information indicating one or more oSTA(s) with which oAP1 intends to communicate during the current transmit opportunity or performs coordinated beamforming and/or indicating the pair of STA1 and oSTA1 that can be served simultaneously by the AP1 and oAP1 as part of the subsequent transmission, and
- the maximum number of degrees of freedom that can be used by AP1 for serving the one or more STA(s) simultaneously with the transmission from oAP1 to oSTA1.

The first time information generally includes an indication of one or more of:

- the time when AP1 expects to transmit an acknowledgment request to STA1,
- the time when AP1 expects to receive an acknowledgement from STA1in response to transmission of the first data unit,
- if an acknowledgement request will be included with a subsequent first data unit or if and when it will be transmitted separately,
- if the subsequent coordinated beamforming transmission shall start in a synchronized manner,
- if and to which extent the transmission of the second data unit can exceed the transmission of the first data unit, a length (T_p in FIG. 4) of the first data unit transmitted with beamforming weights chosen corresponding to the indication by the first beamforming configuration, and a duration of a succession of first data units transmitted with beamforming weights chosen corresponding to the indication by the first beamforming configuration and interframe space times.

The second time information generally includes an indication of one or more of:

the time when oAP1 expects to transmit an acknowledgment request to oSTA1, the time when oAP1 expects to receive an acknowledgement from oSTA1 in response to transmission of the second data unit, if an acknowledgement request will be included within the subsequent second data unit, a confirmation that the subsequent transmission will be performed synchronized with the transmission from AP1 to STA1, if it was requested by the first time information, a length of the second data unit sent with beamforming weights as indicated by the second beamforming information, and a duration of a succession of data units sent with the beamforming configuration indicated by the second beamforming information and interframe space times.

In an embodiment, when starting the CBF TXOP, AP1 has traffic for one or more STAs. However, it cannot know if any or which of the oSTAs for which CBF is possible (from beamforming point of view), needs to be served or if the oAP has buffered traffic for them. This is the information that is particularly provided from the oAP together with the confirmation that oAP will participate in the CBF stage. This information will then be considered (taken into account) by AP1. After a confirmation from the oAP together with the identifier of the oSTA it is possible for AP1 to use interference nulling based beamforming.

Hence, the second configuration information of oAP should at least indicate if it will transmit a frame (or data unit) fully or partially overlapped with the frame (or data unit) from the AP1 using coordinated beamforming techniques. If this is the case, it shall further include which beamforming configuration will be used during the fully or partially overlapped transmission (informing about the beamforming configuration meaning informing either which is the oSTA that it will serve or informing an indication of a beamforming configuration or of a group AID which indicates the pair of STA and oSTA which will be served together by the respective APs to which they are associated).

There are two possible points regarding synchronization: As a first point, request the coordinated transmissions to start synchronized (this will require that the subsequent PPDU is sent with extended estimation and/or pilot sequences) and/or, as a second point, send a frame before the preamble mapped coordinated transmission, after which both AP1 and oAP1 start their transmissions within SIFS (or a predefined interval).

Figure 4:
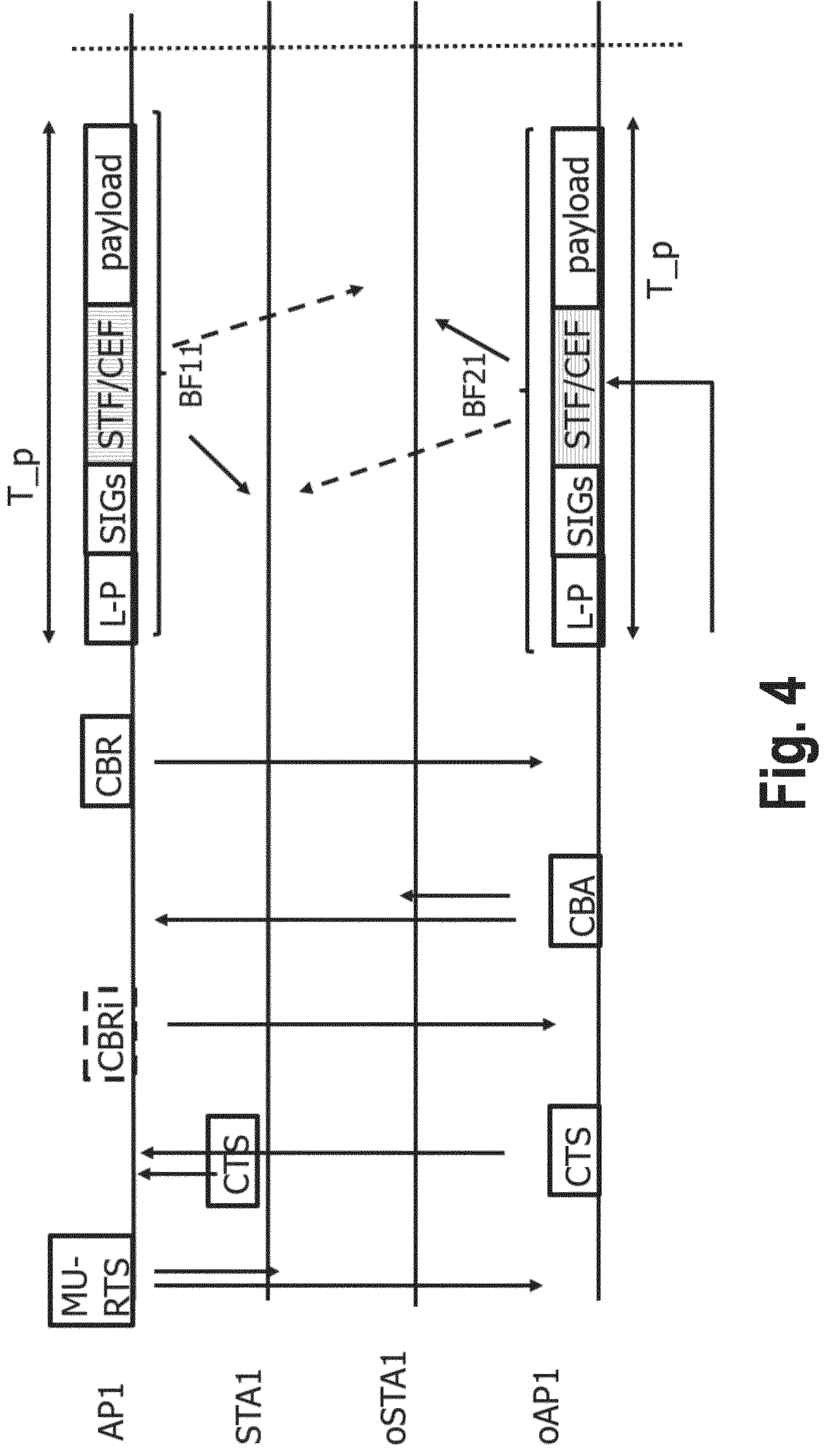
FIG. 4 shows a diagram of another embodiment of a communication scenario according to the present disclosure using simultaneous coordinated beamforming with extended estimation.

FIG. 4 shows a diagram of another embodiment of a communication scenario according to the present disclosure using simultaneous coordinated beamforming with extended estimation. In this case, the start of the transmission of the PPDUs from AP1 and oAP1 is synchronized. Both APs modify the estimation fields (STF/CEF) such that STA1 and oSTA1 can individually determine not only the channels from their own AP but also from the interfering AP. For instance, STA1 can estimate both the channel from AP1 as well as the one from oAP1.

To achieve this, in an embodiment the two APs are extending the number of LTF sequences based on which estimation is performed to achieve orthogonalization of the estimation sequences used by the two APs. The extension may accommodate the total number of spatial streams that will be exchanged by the two APs during one CBF DL PPDU transmission. More precisely, if oAP1 intends to send $$N_{SS}^{oAP1}$$

streams to oSTA1 and AP1 intends to send $$N_{SS}^{AP1}$$

streams to STA1, then during the coordinated DL transmission both APs may use at least $$N_{SS}^{oAP1} + N_{SS}^{AP1}$$

estimation sequences. Furthermore, these estimation sequences are created by extending the orthogonal P matrix to the desired dimension and each AP selecting a number of rows corresponding to the desired number of spatial streams. The selection may be done such that the selected rows are mutually different.

Figures 5, 6:
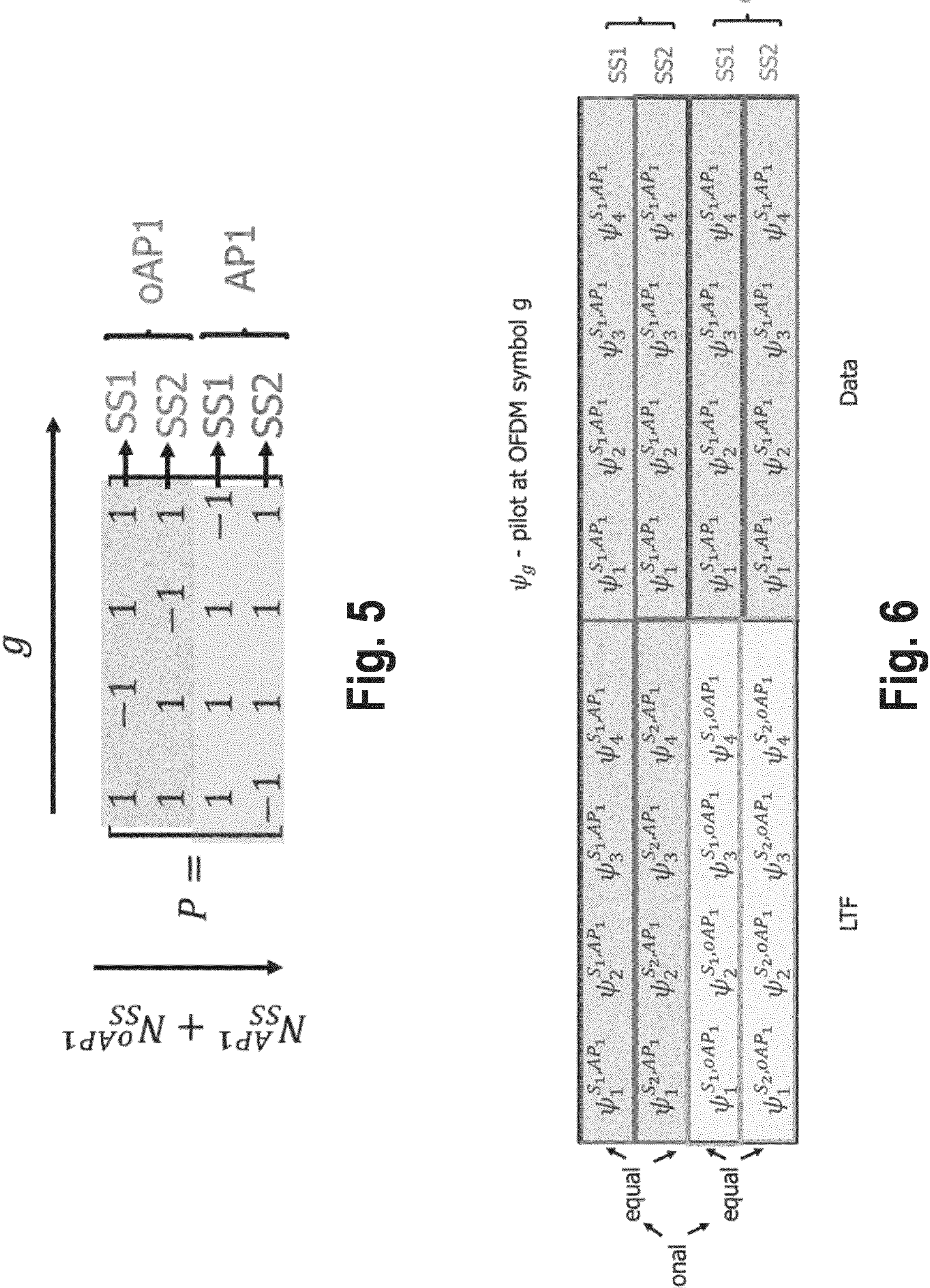
FIG. 5 shows an example of a projection matrix.
FIG. 6 shows modified pilot sequences for enhanced noise estimation.

In the example shown in FIG. 4, oAP1 can select the first $$N_{SS}^{oAP1}$$

rows and signal within the CBA, the AP1 will select a different set of $$N_{SS}^{AP1}$$

rows of a projection matrix as shown in FIG. 5 and signal within the CBR. Upon reception of the CBR, oAP1 updates its number of LTF sequences and both APs start transmission with the extended estimation. In FIG. 5, index g denotes the LTF index in the order of transmission. Similarly, it can be referred to as a time index of an LTF.

Additionally, to improve the noise estimation, the following change to the pilot sequences used within the two PPDUs may be made. In a regular transmission pilot sequences are used during preamble as well as during data payload transmission, and their main goal is to track and correct phase and frequency changes during the PPDU. For this operation it is sufficient that the values used for the pilots within the preamble part are the same as the ones used for the pilots sent during the data part. Furthermore, in regular transmissions, single stream pilots are sufficient as phase tracking of only a single transmitter is performed based on these.

For the coordinated beamforming transmission, the pilots can still be transmitted with a single stream. However, it may be beneficial to choose each of the streams used by an AP orthogonal to the one used by the other AP. More specifically, the pilots of the BSS and OBSS transmission for a subcarrier k and LTF symbol g can be set as:

$$\left[\psi_{LTF}^{AP1}\right]_{k,g} = r_{LTF,g}^{AP1}\tau_k \text{ and } \left[\psi_{LTF}^{oAP1}\right]_{k,g} = r_{LTF,g}^{oAP1}\tau_k$$

where $$\left[\psi_{LTF}^{AP1}\right]_{k,g}$$

is the pilot at subcarrier k and symbol g, used during the LTF sequence by the AP1, $\tau_k$ is the training symbol at subcarrier k, g is the index of the OFDM symbol and $r_g$ are elements of a mapping matrix R, similar to the projection matrix P. In the usual implementations, the R matrix is set to the first row of the P matrix, regardless of the number of streams or other considerations.

In an implementation, illustrated in FIG. 6 showing modified pilot sequences for enhanced noise estimation, the first AP can choose the default first row for the P matrix and the second AP (e.g., AP1 in FIG. 4) may choose the first row of the P matrix that it itself uses (e.g., third row in the example of FIGS. 5 and 6). If multiple streams are transmitted by any of the APs, the pilots are equal across these multiple streams, as there is mainly interest in separating the effect of the oBSS from that of the BSS. Generally, and in other words, each transmitter that transmits at a point in time requires a distinct orthogonal pilot. Furthermore, within the payload, the pilot sequences are left unaltered across BSSs. More specifically, for the k-th subcarrier and g-th symbol the two pilot sequences can be written as $$\left[\psi_{Data}^{AP1}\right]_{k,g} = \left[\psi_{Data}^{oAP1}\right]_{k,g}$$

By performing estimation on the pilots within the preamble and data parts of the PPDU and performing an averaging operation, an improved noise estimate can be obtained. Thanks to these techniques, sudden noise variations, occurring within the payload due to, e.g., earlier termination of the interfering transmission or sequences of interfering DL PPDUs, can be estimated better and provided to a minimum mean squared error (MMSE) equalizer.

In order to ensure a correct decoding of the PPDUs with the new estimation and/or pilot sequences, the STAs should be informed by the two corresponding APs. In the implementation example illustrated in FIG. 4, within the CBA one or more (preferably all of) the following indications should be present:

- whether orthogonal estimation sequences and/or the orthogonal pilots are used;
- which sequences are used;
- which pilots are used.

Each of the APs may request the use of the orthogonal sequences based on the freshness of the CSI at the respective AP.

Figure 7:
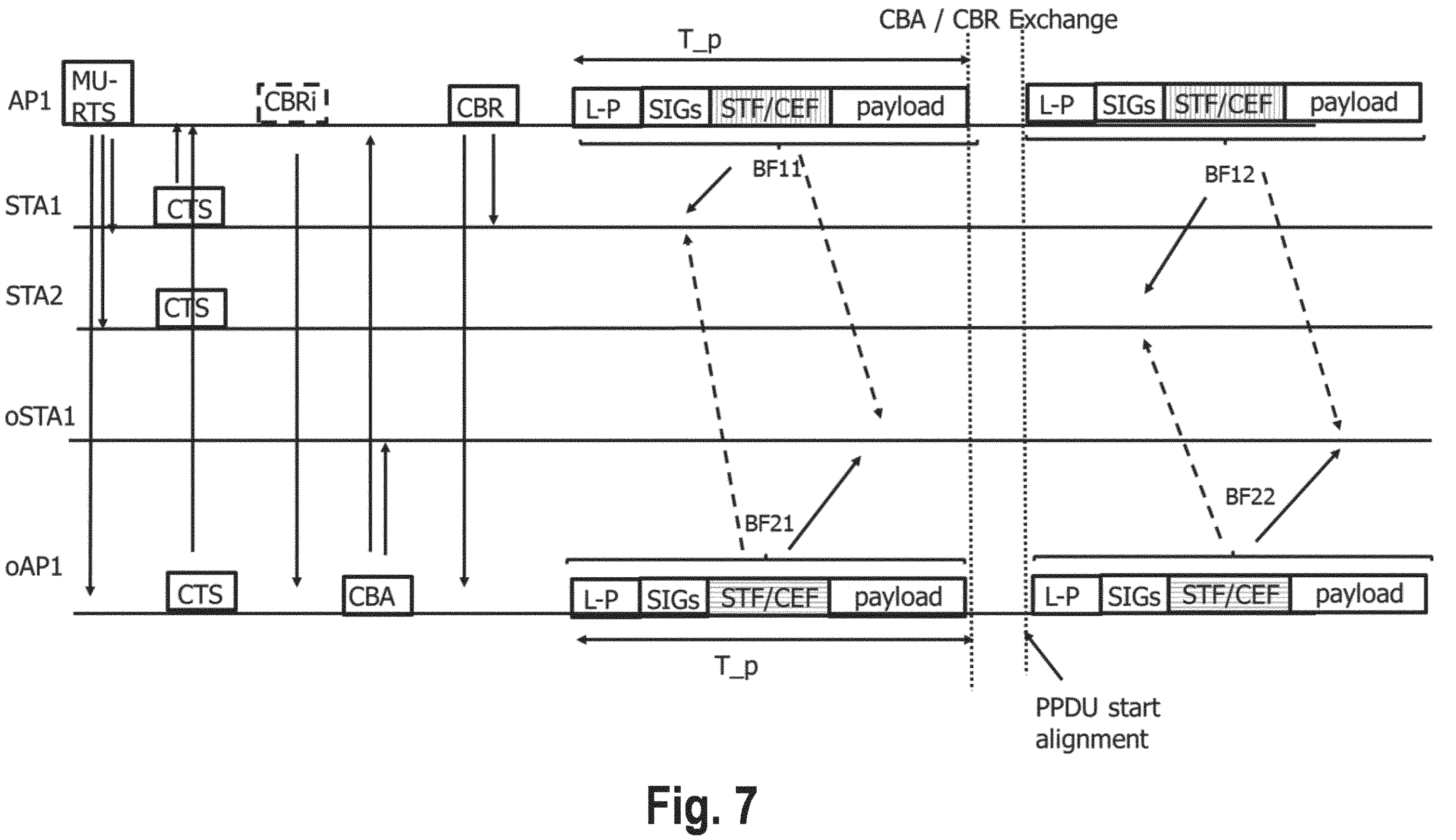
FIG. 7 shows another embodiment of a communication scenario according to the present disclosure using multi-user sequences of single-user coordinated beamforming (CBF) transmissions.

An advantage of the synchronous start mode of operation described in FIG. 4 is the possibility to leverage the relaxation on how often the sounding needs to be performed and serve multiple pairs of STAs during one CBF TXOP, with relatively small additional overhead. This is depicted in FIG. 7 showing another embodiment of a communication scenario according to the present disclosure using multi-user sequences of SU-CBF transmissions. According to this embodiment, in a first stage AP1 transmits towards STA1 with the beamforming configuration BF11, nulling the interference towards oSTA1, while oAP1 transmits towards oSTA1 with the beamforming configuration BF21, nulling the interference towards STA1. In a second stage, within the TXOP AP1 transmits to a second station STA2 while nulling the interference towards oSTA1, while oAP1 continues transmitting towards oSTA1 however with a modified beamforming configuration BF22, which nulls the interference towards STA2.

In between the two stages a new CBA/CBR exchange may be performed to announce the new configuration parameters for the CBF. A prerequisite for this scheme is that a coordinated training phase has been performed, in which one or more of the beamforming configurations that can be used simultaneously by the AP1 and oAP1 has been determined after a collection of channel state information from both the STAs and oSTAs, targeted within the TXOP. Therefore, after the first announcement of the AID of the STA to be next nulled, e.g. from an AP1, the oAP1 chooses one of the oSTAs for which two conditions are fulfilled: there is a beamforming configuration which does not create interference towards the chosen STA and there is traffic to be sent to the respective oSTA. Based on the length information within the initial CBA/CBR PPDUs, it can be inferred when a new CBA/CBR exchange can be performed.

A modified implementation is, to have the CBA frame transmitted SIFS after the longest PPDU transmission. Although for a synchronous start CBF operation an alignment of the DL PPDU terminations is not required, constraints to ensure that one transmission is not significantly longer than the other one can be envisioned.

Figure 8:
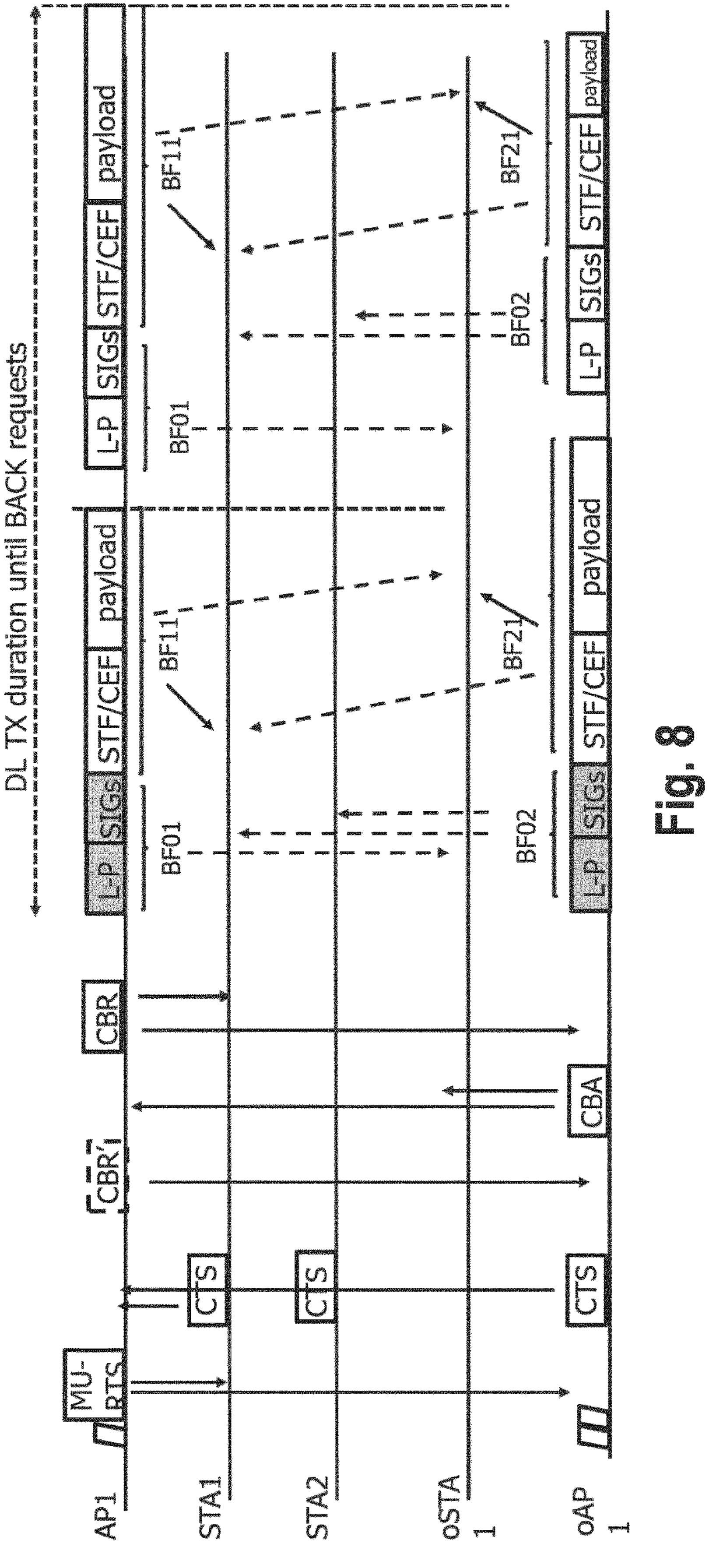
FIG. 8 shows another embodiment of a communication scenario according to the present disclosure using multi-user sequential CBF transmission without PPDU alignment and null space beamforming.

For the sequential CBF transmission (i.e. transmission with several preamble mapped PPDUs, one after the other), relaxing the constraints on the synchronous start of the PPDUs, which are not the first in the sequence, is possible. However, several design modifications should be considered. In this case, there are no CBA/CBR exchanges in between, thus the configuration of the preambles of the beamformed PPDUs may be kept the same for all the PPDUs within a sequence. Furthermore, a duration information may be signaled inside the initial CBA and replicated within the CBR to announce the end of simultaneous transmissions with beamforming applied on preambles and start of an acknowledgement or uplink phase. To make such a solution viable for multi-user sequential CBF transmission, given the constraint of keeping the configuration of the preamble transmission format, is to modify the design as depicted in FIG. 8 showing another embodiment of a communication scenario according to the present disclosure using multi-user sequential CBF transmission without PPDU alignment and null space beamforming.

In this case, the preambles are still sent with preamble mapping, however the used beamforming matrix is not necessarily the one used for the payload transmission but one whose purpose is only to control the interference towards the STAs from the other BSS, participating in the CBF. More specifically, this may be achieved by applying on the preambles a beamforming matrix, which is only based on the nulled space component of the channel matrices corresponding to the STAs for which the interference should be controlled. For example, to compute the BF02 towards STA1 and STA2, oAP1 may perform a singular value decomposition (SVD) of the channel matrices between oAP1 and STA1 and oAP1 and STA2, respectively. Based on this decomposition, it finds a beamforming matrix corresponding to the minimum between the number of streams to be used for the follow-up transmission and the dimension of the null space, resulting from the SVD. In case this number is larger than 1, the resulting singular vectors corresponding to the determined null space are used for the BF02 transmission. For the payload transmission, BF21 is a multiplication of the null space component with a second component accounting for the best singular vectors of the channel towards STA1. Similarly, AP1 applies the BF01 in the null space of oSTA1, without fine-tuning to STA1 or STA2 channel. Then, it is ensured that the two STAs are capable of decoding the preamble, as in this case the configuration stays the same. In this case, having an AP1 changing the intended receiver between STA1 and STA2 can be done without having to inform the two STAs of the new parameters in separate PPDUs, as both STAs can decode the header or legacy preamble with the beamformers applied. Within the training phase preceding the CBF transmission there may be ensured that a transmission with null space based matrices can be received by the two STAs with a good enough SNR such as to allow a correct decoding of the preamble information.

In the following a second case will be described according to which the channel is busy at the start of a CBF stage for the other AP. So far, the operation for the case in which both the AP1 and the oAP1 detect the channel as idle at the point in time when the other one is initiating the coordinated beamforming transmit opportunity has been considered. Implementation examples when this is not the case are illustrated in FIGS. 9 and 10.

Figure 9:
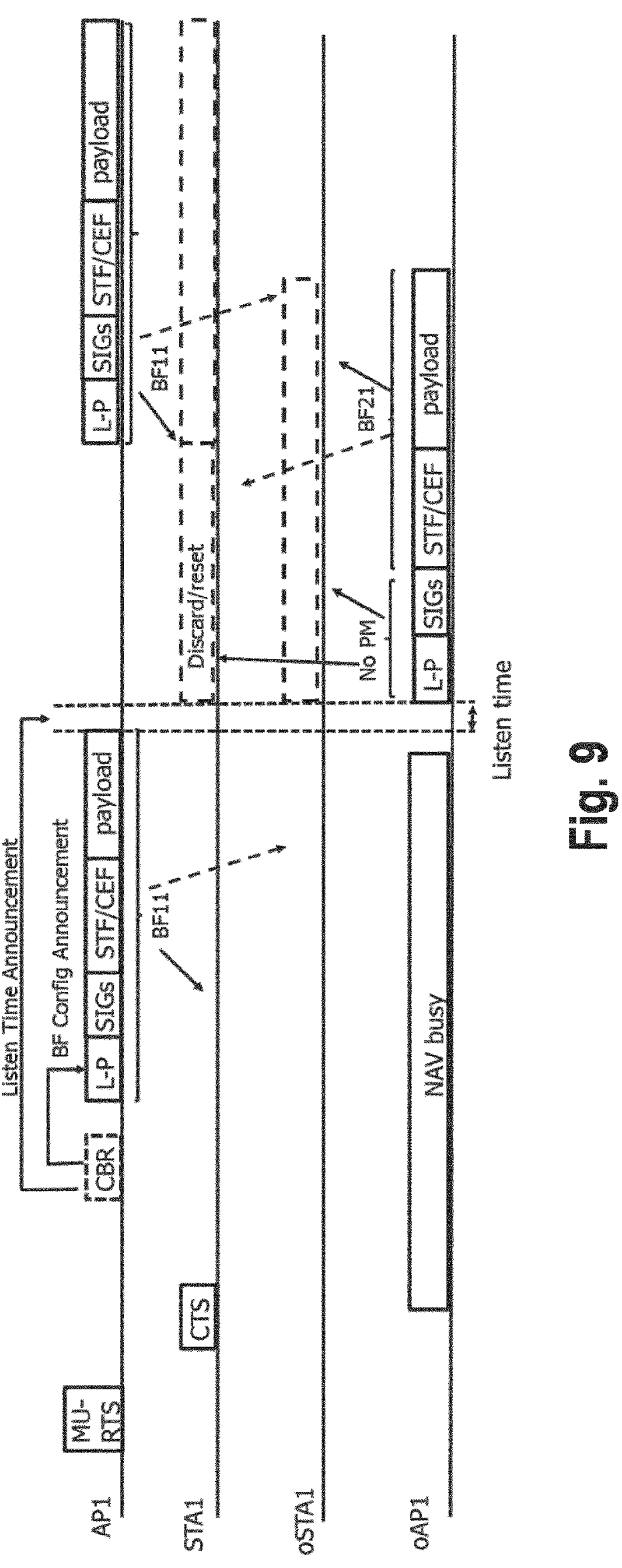
FIG. 9 shows another embodiment of a communication scenario according to the present disclosure according to which the network allocation vector (NAV) is busy for the second communication device at the start of the CBF.
Figure 10:
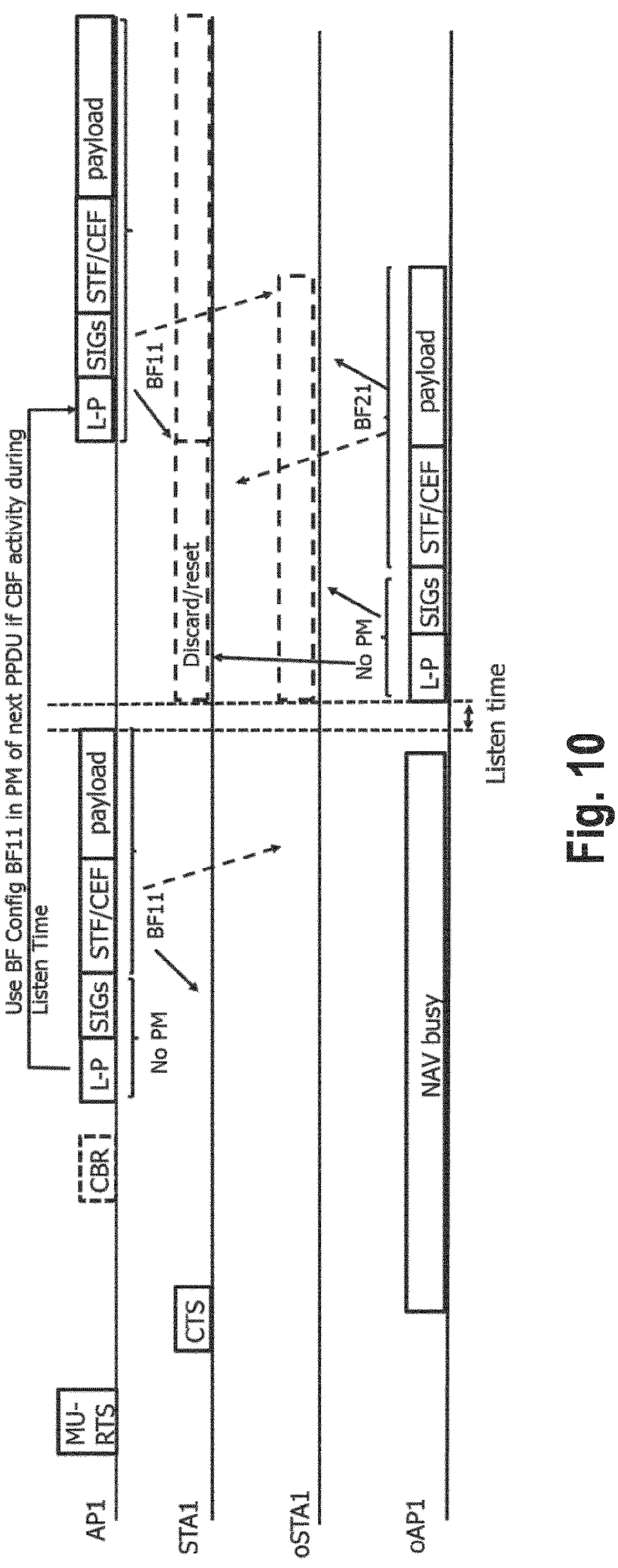
FIG. 10 shows another embodiment of a communication scenario according to the present disclosure without preamble mapping while NAV busy at the second communication device.

It shall be assumed that, as in the previous cases, AP1 wins contention and initiates a CBF TXOP. The oAP1 has, however, the NAV set to busy so that it can neither respond with a CTS nor send the CBA. AP1 can behave in one of the following ways:

A first implementation example is depicted in FIG. 9 showing another embodiment of a communication scenario according to the present disclosure according to which the network allocation vector (NAV) indicates that the channel is busy for oAP1 at the start of the CBF. AP1 sends, after a timeout expires and no activity from oAP1 was detected, the CBR announcing the configuration of the following PPDU, as in the previous case, followed by a PPDU with the beamformed preamble. After the end of the PPDU transmission, AP1 starts a listening period, in which an oAP1 can start a PPDU transmission, assuming the channel has become idle. Since the oAP1 has however not yet been informed of the configuration of the CBF PPDU, it starts with a regular PPDU (i.e., without beamforming applied on the preamble). Based on this, AP1 determines the length of the PPDU, and the length of the preamble. AP1 will start a beamformed transmission, in which the same beamformer is used during the preamble as was used during the previous PPDU sent from AP1 to STA1.

Furthermore, the transmission may start after the oAP1 has finished transmitting the preamble part plus an optional safety margin in order to allow a STA1, which may have received the transmission of the oAP1 to oSTA1, to decode the preamble, and based of the SIG information to determine that the PPDU is not destined for itself. Further, if based on SIG information, the respective STA1 determines that the PPDU was sent as part of the CBF scheme, it discards the packet and resets the PHY to start receiving the correct PPDU that is destined for itself, i.e. the PPDU from AP1. Determining whether the PPDU has been sent as part of the CBF scheme can be done based on indications such as: BSS color (i.e., the BSS color of the oAP1 corresponds to the one announced by AP1 as BSS whose AP participated in the respective CBF), AID (which currently exist within the SIG fields) or a CBF identifier (which indicates the index of a CBF which is allowed during the TXOP).

Another implementation example is depicted in FIG. 10 showing another embodiment of a communication scenario according to the present disclosure without preamble mapping while NAV busy at oAP1. In this case, the transmission from AP1 to STA1 is without preamble mapping as long as there is no response from oAP1. An indication within the preamble is present stating that a follow up PPDU will be sent after a listen time. In case, a CBF PPDU is received from the oAP1, the follow-up PPDU from the AP1 towards STA1 will be sent with the same beamforming and legacy preamble or header configuration as utilized during the payload transmission of the non-preamble mapped PPDU. Constraints on the length of the PPDU from the oAP1 to the oSTA1 may be imposed, such as a maximum length. Furthermore, one of the following conditions may be imposed: i) there is only one PPDU sent from oAP1 to oSTA1; after the transmission oAP1 waits for a continuation indication from AP1; or ii) the length of the AP1 transmission does not exceed that of the oAP1 transmission; this is to ensure a correct continuation of the transmission after the overlapped transmission of the two APs.

For transmissions with loose synchronization, a problem of interference during guard intervals may occur. A potential solution for this is that the receiver changes the windowing it applies in between the OFDM symbols. For example, using window functions with larger transition times between the OFDM symbols can improve the resilience to this type of error. For the STA to know that it should adapt the windowing functions, the APs should indicate whether the CBF transmissions are performed in synchronized or unsynchronized manner and potentially how much deviation with respect to OFDM symbol boundaries are allowed. Based on this information, STAs can adapt the transition time of the windowing functions.

Figure 11:
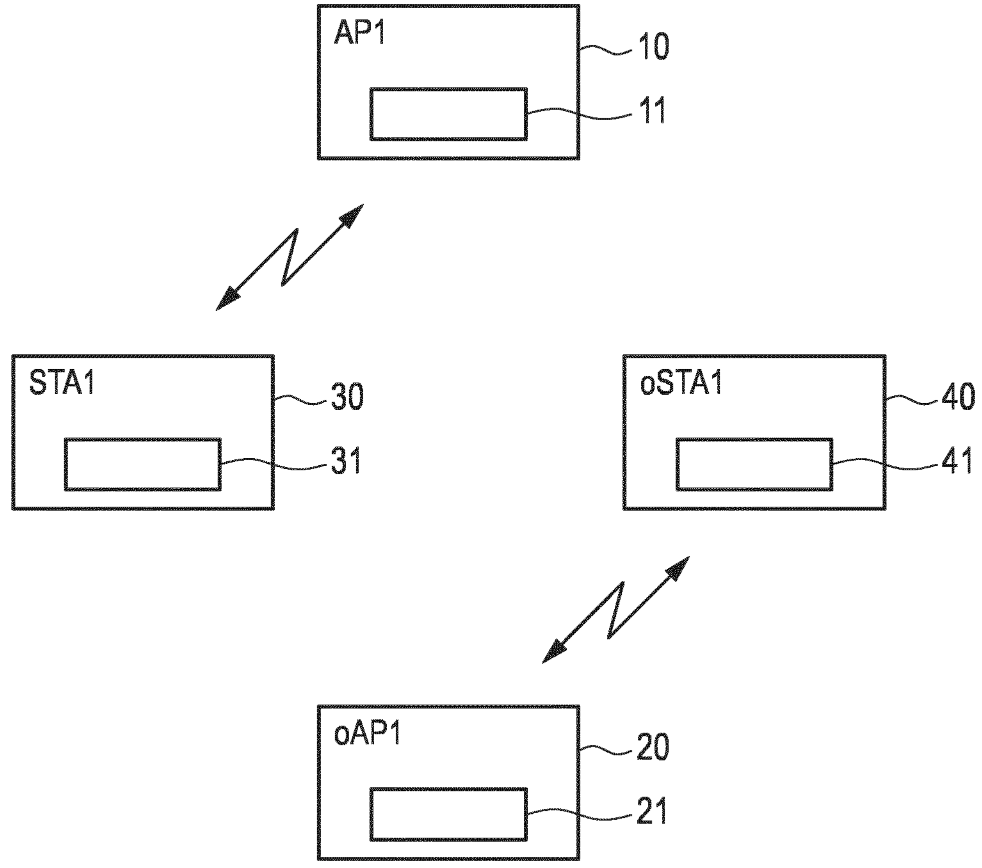
FIG. 11 shows a diagram illustrating a communication system including a first communication device, a second communication device, a third communication device and a fourth communication device according to the present disclosure.

FIG. 11 shows a diagram illustrating a communication system according to an aspect of the present disclosure including a first communication device 10 (AP1) for communicating with one (or more) third communication device(s) 30 (STA1) and a second communication device 20 (oAP1) for communicating with one (or more) fourth communication device(s) 40 (OSTA1). According to the present disclosure the two APs 10, 20 are within overlapping basic service sets and engage in partially or fully overlapped downlink transmissions towards the respective associated station(s) 30, 40. At the same time the interference towards the other stations involved in the coordinated communication scheme is controlled and suppressed/reduced.

In this context it shall be noted that beamforming is generally not applied to all connected oSTAs but to the one or more oSTA(s) for which in a previous training stage it was decided that interference towards them can be nulled at the same time with the particular STA which is being served by the AP. The oAP1 indicated within second configuration information that there is buffered traffic for oSTA and oAP1 will send a frame in CBF fashion to oSTA during the CBF TXOP requested by AP1 for STA1. Further, the intention is that the preamble is only beamformed with a matrix within the null space of oSTA(s) and the payload is beamformed with a matrix obtained from both the null space of one or more oSTA(s) and the SVD of the particular STA(s) that will be served.

Each of the communication devices 10, 20, 30, 40 comprises circuitry 11, 21, 31, 41 that is configured to perform particular operations. The circuitries may be implemented by a respective processor or computer, i.e., as hardware and/or software, or by dedicated units or components. For instance, respectively programmed processors may represent the respective circuitries 11, 21, 31, 41.

Figure 12:
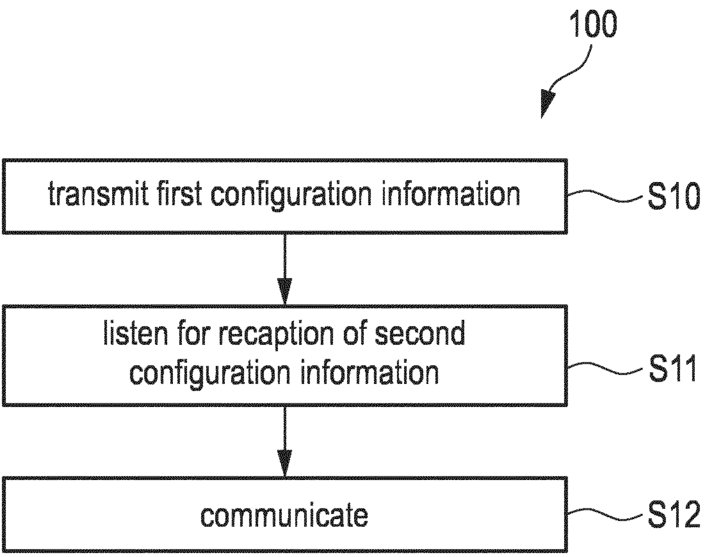
FIG. 12 shows a flow chart of an embodiment of a first communication method of the first communication device according to the present disclosure.

FIG. 12 shows a flow chart of an embodiment of a first communication method 100 of the first communication device 10 according to the present disclosure, which may be performed by the circuitry 11. In a first step S10 first configuration information is transmitted.

The first configuration information includes first beamforming configuration information and first time information indicating the duration of an intended transmission of one or more data units, to which the first configuration information applies, from the first communication device to one or more third communication devices and/or the maximum duration of simultaneous transmissions of data units by the first communication device and a second communication device that is configured to communicate with one or more fourth communication devices. In a second step S11 the first communication device listens for reception of second configuration information from the second communication device. The second configuration information includes second beamforming configuration information and second time information indicating the duration of an intended transmission of one or more data units, to which the second configuration information applies, to one or more fourth communication devices. In a third step S12 the first communication device communicates with the one or more third communication devices using the first configuration information and, if received, considering the second configuration information using coordinated beamforming. The communication includes to transmit a first data unit, comprising a preamble and a payload, to a third communication device, wherein beamforming weights are used for transmitting both the preamble and the payload of the first data unit that reduce or minimize interference towards a fourth communication device, i.e. interference nulling is used.

Figure 13:
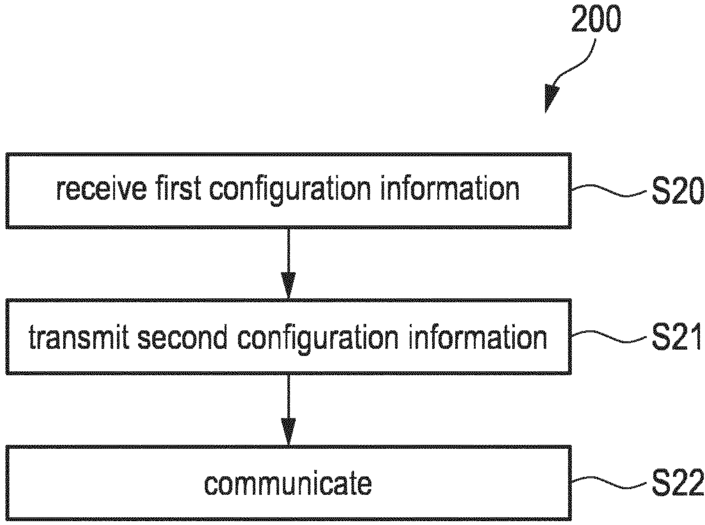
FIG. 13 shows a flow chart of an embodiment of a second communication method of the second communication device according to the present disclosure.

FIG. 13 shows a flow chart of an embodiment of a second communication method 200 of the first communication device 20 according to the present disclosure, which may be performed by the circuitry 21. In a first step S20 first configuration information is received from the first communication device. In a second step S21 second configuration information is transmitted to one or more fourth communication devices. In a third step S22 the second communication device communicates with the one or more fourth communication devices using the second configuration information and considering the first configuration information using coordinated beamforming, wherein the communication includes to transmit a second data unit, comprising a preamble and a payload, to a fourth communication device. Hereby, beamforming weights are used for transmitting both the preamble and the payload of the second data unit that reduce or minimize interference towards a third communication device to which the first communication device transmits a first data unit at least partly overlapping in time with the transmission of the second data unit from the second communication device to the fourth communication device, i.e., interference nulling is used.

Figure 14:
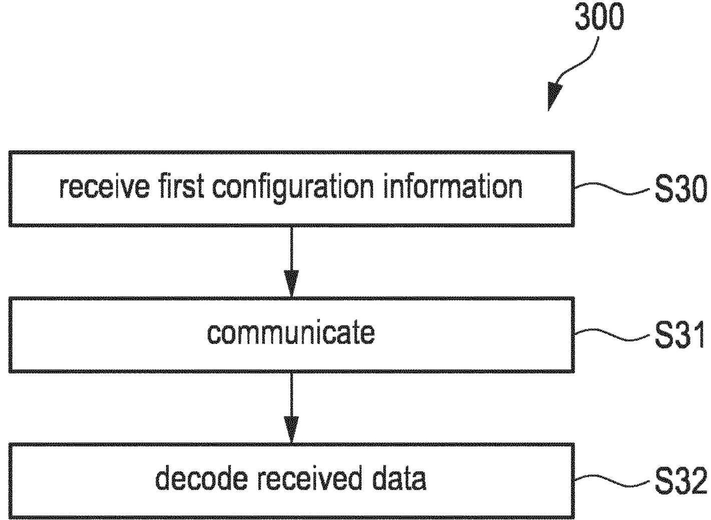
FIG. 14 shows a flow chart of an embodiment of a third communication method of the second communication device according to the present disclosure.

FIG. 14 shows a flow chart of an embodiment of a third communication method 300 of the first communication device 30 according to the present disclosure, which may be performed by the circuitry 31. In a first step S30 first configuration information is received. In a second step S31 the third communication device communicates with the first communication device, wherein the communication includes to receive a first data unit, comprising a preamble and a payload, transmitted from the first communication device, wherein beamforming weights are used for transmitting both the preamble and the payload of the first data unit. In a third step S32 the received first data unit is decoded using the first configuration information.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits or circuitry. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors which are programmed or configured according to software code. A circuit does not include pure software, although a circuit includes the abovedescribed hardware executing software. A circuit or circuitry may be implemented by a single device or unit or multiple devices or units, or chipset(s), or processor(s).

It follows a list of further embodiments of the disclosed subject matter:

1. First communication device configured to communicate with one or more third communication devices, the first communication device comprising circuitry configured to transmit first configuration information including first beamforming configuration information and first time information indicating the duration of an intended transmission of one or more data units, to which the first configuration information applies, from the first communication device to one or more third communication devices and/or the maximum duration of simultaneous transmissions of data units by the first communication device and a second communication device that is configured to communicate with one or more fourth communication devices;

listen for reception of second configuration information from the second communication device, the second configuration information including second beamforming configuration information and second time information indicating the duration of an intended transmission of one or more data units, to which the second configuration information applies, to one or more fourth communication devices; and communicate with the one or more third communication devices using the first configuration information and, if received, considering the second configuration information using coordinated beamforming, wherein the communication includes to transmit a first data unit, comprising a preamble and a payload, to a third communication device, wherein beamforming weights are used for transmitting both the preamble and the payload of the first data unit that reduce or minimize interference towards a fourth communication device.

2. First communication device as claimed in claim 1, wherein the circuitry is configured to use beamforming weights for transmitting the first data unit to the third communication device using interference nulling that reduce or minimize interference towards one or more fourth communication devices to which the second communication device transmits or intends to transmit a second data unit at least partly overlapping in time with the transmission of the first data unit from the first communication device to the third communication device.

3. First communication device as defined in any one of the preceding embodiments, wherein the circuitry is configured to announce that the transmission of data units within the current transmit opportunity can be performed with coordinated beamforming.

4. First communication device as defined in embodiment 3, wherein the circuitry is configured to transmit the announcement in a data unit or frame before the transmission or along with the transmission of the first configuration information, the data unit or frame including identification information of a third communication device, with which coordinated beamforming is performed, and of the second communication device, which performs coordinated beamforming, within the current transmit opportunity.

5. First communication device as defined in any one of the preceding embodiments, wherein the first beamforming configuration information comprises one or more of:

the number of spatial streams used by the first communication device for transmitting the first data unit to the third communication device, identification information indicating one or more third communication devices with which the first communication device intends to communicate during the current transmit opportunity and/or indicating one or more pairs of third and fourth communication devices that can be served simultaneously by the first and second communication devices, and the maximum number of degrees of freedom, including spatial dimensions and/or spatial streams and/or space time streams, that can be used by the second communication device for serving the one or more fourth communication devices simultaneously with the transmission from the first communication device to the third communication device; and/or wherein the second beamforming configuration information comprises one or more of:

the number of spatial streams used by the second communication device for transmitting the second data unit to the fourth communication device, identification information indicating one or more fourth communication devices with which the second communication device intends to communicate during the current transmit opportunity or performs coordinated beamforming and/or indicating the pair of third and fourth communication devices that can be served simultaneously by the first and second communication devices as part of the subsequent transmission, and the maximum number of degrees of freedom that can be used by the first communication device for serving the one or more third communication devices simultaneously with the transmission from the second communication device to the fourth communication device.

6. First communication device as defined in any one of the preceding embodiments, wherein the first time information includes an indication of one or more of the time when the first communication device expects to transmit an acknowledgment request to the third communication device, the time when the first communication device expects to receive an acknowledgement from the third communication device in response to transmission of the first data unit, if an acknowledgement request will be included with a subsequent first data unit or if and when it will be transmitted separately, if the subsequent coordinated beamforming transmission shall start in a synchronized manner, if and to which extent the transmission of the second data unit can exceed the transmission of the first data unit, a length of the first data unit transmitted with beamforming weights chosen corresponding to the indication by the first beamforming configuration, and a duration of a succession of first data units transmitted with beamforming weights chosen corresponding to the indication by the first beamforming configuration and interframe space times;

and/or wherein the second time information includes an indication of one or more of:

the time when the second communication device expects to transmit an acknowledgment request to the fourth communication device, the time when the second communication device expects to receive an acknowledgement from the fourth communication device in response to transmission of the second data unit, if an acknowledgement request will be included within the subsequent second data unit, a confirmation that the subsequent transmission will be performed synchronized with the transmission from the first communication device to the third communication device, if it was requested by the first time information, a length of the second data unit sent with beamforming weights as indicated by the second beamforming information, and a duration of a succession of data units sent with the beamforming configuration indicated by the second beamforming information and interframe space times.

7. First communication device as defined in any one of the preceding embodiments, wherein the circuitry is configured to transmit the first configuration information in a data unit or frame before or after reception of a data unit or frame including the second configuration information.

8. First communication device as defined in any one of the preceding embodiments, wherein the circuitry is configured to synchronize the start of the transmission of the first data unit to the third communication device with the start of the transmission of the second data unit by the second communication device to the fourth communication device.

9. First communication device as defined in embodiment 8, wherein the circuitry is configured to request a second communication device to synchronize the transmission of the second data unit towards the fourth communication device with the transmission of the first data unit from the first communication device to the third communication device, if the time interval between a sounding phase and the communication phase exceeds a predefined threshold.

10. First communication device as defined in any one of the preceding embodiments, wherein the circuitry is configured to include into the preamble of the first data unit a number of estimation sequences, the number corresponding to the number of spatial streams, wherein the estimation sequences are different from estimation sequences included by the second communication device into the preamble of the second data unit.

11. First communication device as defined in embodiment 10, wherein the circuitry is configured to select the estimation sequences from a projection matrix comprising a number of orthogonal estimation sequences, the number being equal to or larger than the sum of the number of spatial streams used by the first communication device for transmitting the first data unit and the number of spatial streams used by the second communication device for transmitting the second data unit.

12. First communication device as defined in any one of the preceding embodiments, wherein the circuitry is configured to include into the first data unit one or more of pilot sequences that are orthogonal to the pilot sequences included by the second communication device into the second data unit a pilot sequence for all streams within a training field of the first data unit, which pilot sequence is orthogonal to the pilot sequence for all streams within the training field of the second data unit, and pilot sequences within the data portion of the first data unit that are identical to pilot sequences included in the second data unit.

13. First communication device as defined in embodiment 11 or 12, wherein the circuitry is configured to transmit, as part of the first configuration information, an indication:

whether orthogonal estimation sequences and/or orthogonal pilot sequences are used, which estimation sequences have been selected from the projection matrix, and/or which pilot sequences are used.

14. First communication device as defined in any one of the preceding embodiments, wherein the circuitry is configured to transmit new first configuration information and/or receive new second configuration information before transmitting a new data unit to another third communication device.

15. First communication device as defined in any one of the preceding embodiments, wherein the circuitry is configured to transmit the preamble of the first data unit and the payload of the first data unit using different beamforming weights.

16. First communication device as defined in embodiment 15, wherein the preamble beamforming weights are configured to reduce or minimize interference towards one or more fourth communication devices connected to the second communication device and the payload beamforming weights are configured to reduce or minimize interference towards the fourth communication device to which the second communication device transmits the second data unit and/or to improve the communication link with the third communication device, towards which the first data unit is sent.

17. First communication device as defined in any one of the preceding embodiments, wherein the circuitry is configured, if second configuration information has not been received from the second communication device, to transmit the first data unit to the third communication device using interference nulling, listen, after the transmission of the first data unit, for reception of a third data unit from the second communication device, and, if received, derive third configuration information from the preamble of the third data unit, the third configuration information indicating the duration of the third data unit and, optionally, of its preamble, and transmit, after the preamble of the third data unit has been completely received, a fourth data unit to one of the third communication devices using interference nulling in the preamble and the payload fields.

18. First communication device as defined in any one of the preceding embodiments, wherein the circuitry is configured, if second configuration information has not been received from the second communication device, to transmit the first data unit to the third communication device using interference nulling only for the payload and indicating within the preamble that a subsequent fourth data unit will be transmitted after a listening period, listen, after the transmission of the first data unit, for reception of a third data unit from the second communication device, derive third configuration information from the preamble of the third data unit, the third configuration information indicating the duration of the third data unit and of its preamble, and transmit, after the preamble of the third data unit has been completely received, a fourth data unit to one of the third communication devices using the same interference nulling as used in the transmission of the payload of the first data unit.

19. First communication device as defined in any one of the preceding embodiments, wherein the circuitry is configured in case a third data unit was received, the fourth data unit is sent after the preamble of the third data unit was completely received and a time margin has passed and the transmission is with interference nulling applied on both preamble and payload fields, and in case a third data unit was not received, the fourth data unit is sent within a predefined time interval to the third communication device with no preamble mapping applied.

20. First communication device as defined in any one of the preceding embodiments, wherein the circuitry is configured to consider the second configuration information by determining, based on the second configuration, if the second communication device will transmit one or more data unit that fully or partially overlap with the transmission of the one or more data units by the first communication device, to which one or more fourth communication units the second communication unit will transmit, and which group of third and fourth communication devices can be served simultaneously by the first and second communication devices.

21. First communication device as defined in any one of the preceding embodiments, wherein the circuitry is configured to transmit a configuration request requesting the second communication device to transmit the second configuration information.

22. First communication device as defined in any one of the preceding embodiments, wherein the circuitry is configured to request a synchronized transmission if the time interval between a sounding phase and the communication phase exceeds a predefined threshold.

23. First communication device as defined in any one of the preceding embodiments, wherein the circuitry is configured to perform beamforming training to determine the beamforming weights for use in the transmission of data units using interference nulling.

24. Second communication device configured to communicate with one or more fourth communication devices, the second communication device comprising circuitry configured to receive first configuration information from a first communication device that is configured to communicate with one or more third communication devices, the first configuration information including first beamforming configuration information and first time information indicating the duration of an intended transmission of one or more data units, to which the first configuration information applies, from the first communication device to one or more third communication devices or the maximum duration of simultaneous transmissions of data units by the first communication device and the second communication device;

transmit second configuration information including second beamforming configuration information and second time information indicating the duration of an intended transmission of one or more data units, to which the second configuration information applies, to one or more fourth communication devices; and communicate with the one or more fourth communication devices using the second configuration information and considering the first configuration information using coordinated beamforming, wherein the communication includes to transmit a second data unit, comprising a preamble and a payload, to a fourth communication device, wherein beamforming weights are used for transmitting both the preamble and the payload of the second data unit that reduce or minimize interference towards a third communication device to which the first communication device transmits a first data unit at least partly overlapping in time with the transmission of the second data unit from the second communication device to the fourth communication device.

25. Second communication device as defined in embodiment 24, wherein the circuitry is configured, if second configuration information could not be transmitted, to transmit a third data unit to a fourth communication device using interference nulling only for the payload of the third data unit, wherein third configuration information is included into the preamble of the third data unit, the third configuration information indicating the duration of the third data unit and of its preamble.

26. Second communication device as defined in embodiment 25, wherein the circuitry is configured to transmit the third data unit within a predefined interval after the transmission from the first data unit sent by the first device to the third device.

27. Second communication device as defined in any one of embodiments 24 to 26, wherein the circuitry is configured to transmit a response to an announcement of the first communication device that the transmission of data units within the current transmit opportunity can be performed with coordinated beamforming.

28. Third communication device configured to communicate with a first communication device, the third communication device comprising circuitry configured to receive first configuration information including first beamforming configuration information and first time information indicating the duration of an intended transmission of one or more data units, to which the first configuration information applies, from the first communication device to the third communication device and/or the maximum duration of simultaneous transmissions of data units by the first communication device and a second communication device that is configured to communicate with one or more fourth communication devices;

communicate with the first communication device, wherein the communication includes to receive a first data unit, comprising a preamble and a payload, transmitted from the first communication device, wherein beamforming weights are used for transmitting both the preamble and the payload of the first data unit; and decode the received first data unit using the first configuration information.

29. Third communication device as defined in embodiment 28, wherein the circuitry is configured to receive, as part of the first configuration information, an indication:

whether orthogonal estimation sequences and/or orthogonal pilot sequences are used within the first data unit, which estimation sequences are used within the first data unit, and/or which pilot sequences are used within the preamble and/or payload of the first data unit.

30. Third communication device as defined in embodiment 28 or 29, wherein the circuitry is configured to decode the first data unit based on one or more of:

an extended set of estimation sequences, wherein the estimation sequences within the preamble of the first data unit are orthogonal to the estimation sequences within the preamble of the second data unit, pilot sequence within the preamble that is orthogonal to the pilot sequence used in the transmission of the second data units, and pilot sequence within the preamble of the first data unit that is orthogonal to the pilot sequence used within the payload of the first data unit, wherein the estimation and/or pilot sequences are indicated as part of the first configuration information.

31. Third communication device as defined in any one of embodiments 28 to 30, wherein the circuitry is configured to estimate a first channel from the first communication device to itself based on a first set of estimation sequences and to estimate a residual interference from a second communication device, which is configured to communicate with one or more fourth communication devices using coordinated beamforming, to the third communication device based on a second set of estimation sequences.

32. Third communication device as defined in any one of embodiments 28 to 31, wherein the circuitry is configured to discard a third data unit received from a second communication device from the end of the first data unit before the end of the third data unit and receive a fourth data unit transmitted by the first communication device to the third communication device.

33. First communication method of a first communication device that is configured to communicate with one or more third communication devices, the first communication method comprising:

transmitting first configuration information including first beamforming configuration information and first time information indicating the duration of an intended transmission of one or more data units, to which the first configuration information applies, from the first communication device to one or more third communication devices and/or the maximum duration of simultaneous transmissions of data units by the first communication device and a second communication device that is configured to communicate with one or more fourth communication devices;

listening for reception of second configuration information from the second communication device, the second configuration information including second beamforming configuration information and second time information indicating the duration of an intended transmission of one or more data units, to which the second configuration information applies, to one or more fourth communication devices; and communicating with the one or more third communication devices using the first configuration information and, if received, considering the second configuration information using coordinated beamforming, wherein the communication includes to transmit a first data unit, comprising a preamble and a payload, to a third communication device, wherein beamforming weights are used for transmitting both the preamble and the payload of the first data unit that reduce or minimize interference towards a fourth communication device.

34. Second communication method of a second communication device configured to communicate with one or more fourth communication devices, the second communication method comprising:

receiving first configuration information from a first communication device that is configured to communicate with one or more third communication devices, the first configuration information including first beamforming configuration information and first time information indicating the duration of an intended transmission of one or more data units, to which the first configuration information applies, from the first communication device to one or more third communication devices or the maximum duration of simultaneous transmissions of data units by the first communication device and the second communication device;

transmitting second configuration information including second beamforming configuration information and second time information indicating the duration of an intended transmission of one or more data units, to which the second configuration information applies, to one or more fourth communication devices; and communicating with the one or more fourth communication devices using the second configuration information and considering the first configuration information using coordinated beamforming, wherein the communication includes to transmit a second data unit, comprising a preamble and a payload, to a fourth communication device, wherein beamforming weights are used for transmitting both the preamble and the payload of the second data unit that reduce or minimize interference towards a third communication device to which the first communication device transmits a first data unit at least partly overlapping in time with the transmission of the second data unit from the second communication device to the fourth communication device.

35. Third communication device of a third communication device configured to communicate with a first communication device, the third communication method comprising:

receiving first configuration information including first beamforming configuration information and first time information indicating the duration of an intended transmission of one or more data units, to which the first configuration information applies, from the first communication device to the third communication device and/or the maximum duration of simultaneous transmissions of data units by the first communication device and a second communication device that is configured to communicate with one or more fourth communication devices;

communicating with the first communication device, wherein the communication includes to receive a first data unit, comprising a preamble and a payload, transmitted from the first communication device, wherein beamforming weights are used for transmitting both the preamble and the payload of the first data unit; and decoding the received first data unit using the first configuration information.

36. A non-transitory computer-readable recording medium that stores therein a computer program product, which, when executed by a processor, causes the method according to embodiment 33, 34 or 35 to be performed.

37. A computer program comprising program code means for causing a computer to perform the steps of said method according to embodiment 33, 34 or 35 when said computer pro-gram is carried out on a computer.

The invention claimed is:

1. A first communication device configured to communicate with one or more third communication devices, the first communication device comprising circuitry configured to:

transmit first configuration information including first beamforming configuration information and first time information indicating duration of an intended transmission of one or more data units, to which the first configuration information applies to the one or more third communication devices, from the first communication device to the one or more third communication devices and the first configuration information further including the maximum duration of simultaneous transmissions of data units by the first communication device and a second communication device that is configured to communicate with one or more fourth communication devices;

listen for reception of second configuration information from the second communication device, the second configuration information including second beamforming configuration information and second time information indicating the duration of the intended transmission of one or more data units, to which the second configuration information applies to the one or more fourth communication devices, to the one or more fourth communication devices; and communicate with the one or more third communication devices using the first configuration information and, if received, considering the second configuration information using coordinated beamforming, wherein the first communication device transmits a first data unit, comprising a preamble and a payload, to a third communication device of the one or more third communication devices, wherein beamforming weights are used for transmitting both the preamble and the payload of the first data unit that reduce or minimize interference towards a fourth communication device of the one or more fourth communication devices.

2. The first communication device as claimed in claim 1, wherein:

the circuitry is configured to use the beamforming weights for transmitting the first data unit to the third communication device using interference nulling that reduce or minimize interference towards the one or more fourth communication devices to which the second communication device transmits or intends to transmit a second data unit at least partly overlapping in time with the transmission of the first data unit from the first communication device to the third communication device.

3. The first communication device as claimed in claim 1, wherein;

the circuitry is configured to transmit an announcement that the transmission of data units within a current transmit opportunity can be performed with coordinated beamforming.

4. The first communication device as claimed in claim 3, wherein:

the circuitry is configured to transmit the announcement in the first data unit or a frame before the transmission or along with the transmission of the first configuration information, the first data unit or the frame including identification information of the third communication device, with which coordinated beamforming is performed, and of the second communication device, which performs coordinated beamforming, within the current transmit opportunity.

5. The first communication device as claimed in claim 3, wherein the first beamforming configuration information comprises one or more of:

a number of spatial streams used by the first communication device for transmitting the first data unit to the third communication device, identification information indicating the one or more third communication devices with which the first communication device intends to communicate during the current transmit opportunity and/or indicating one or more pairs of the third and fourth communication devices that can be served simultaneously by the first and second communication devices, and a maximum number of degrees of freedom, including spatial dimensions and/or spatial streams and/or space time streams, that can be used by the second communication device for serving the one or more fourth communication devices simultaneously with the transmission from the first communication device to the third communication device;

and/or wherein the second beamforming configuration information comprises one or more of:

the number of spatial streams used by the second communication device for transmitting the second data unit to the fourth communication device, identification information indicating the one or more fourth communication devices with which the second communication device intends to communicate during the current transmit opportunity or performs coordinated beamforming and/or indicating the pair of the third and fourth communication devices that can be served simultaneously by the first and second communication devices as part of a subsequent transmission, and the maximum number of degrees of freedom that can be used by the first communication device for serving the one or more third communication devices simultaneously with the transmission from the second communication device to the fourth communication device.

6. The first communication device as claimed in claim 1, wherein the first time information includes an indication of one or more of;

the time when the first communication device expects to transmit an acknowledgment request to the third communication device, the time when the first communication device expects to receive an acknowledgement from the third communication device in response to transmission of the first data unit, if an acknowledgement request will be included with a subsequent first data unit or if and when it will be transmitted separately, if a subsequent coordinated beamforming transmission shall start in a synchronized manner, if and to which extent the transmission of the second data unit can exceed the transmission of the first data unit, a length of the first data unit transmitted with the beamforming weights chosen corresponding to the indication by the first beamforming configuration, and a duration of a succession of first data units transmitted with the beamforming weights chosen corresponding to the indication by the first beamforming configuration and interframe space times;

and/or wherein the second time information includes an indication of one or more of:

the time when the second communication device expects to transmit an acknowledgment request to the fourth communication device, the time when the second communication device expects to receive an acknowledgement from the fourth communication device in response to transmission of the second data unit, if an acknowledgement request will be included within a subsequent second data unit, a confirmation that a subsequent transmission will be performed synchronized with the transmission from the first communication device to the third communication device, if it was requested by the first time information, a length of the second data unit sent with the beamforming weights as indicated by the second beamforming information, and a duration of a succession of data units sent with the beamforming configuration indicated by the second beamforming information and interframe space times.

7. The first communication device as claimed in claim 1, wherein;

the circuitry is configured to transmit the first configuration information in the first data unit or a frame before or after reception of the first data unit or the frame including the second configuration information.

8. The first communication device as claimed in claim 1, wherein:

the circuitry is configured to synchronize the start of the transmission of the first data unit to the third communication device with the start of the transmission of the second data unit by the second communication device to the fourth communication device.

9. The first communication device as claimed in claim 1, wherein:

the circuitry is configured to include into the preamble of the first data unit a number of estimation sequences, the number corresponding to a number of spatial streams, wherein the estimation sequences are different from estimation sequences included by the second communication device into the preamble of the second data unit.

10. The first communication device as claimed in claim 9, wherein:

the circuitry is configured to select the estimation sequences from a projection matrix comprising a number of orthogonal estimation sequences being equal to or larger than the sum of the number of spatial streams used by the first communication device for transmitting the first data unit and the number of spatial streams used by the second communication device for transmitting the second data unit.

11. The first communication device as claimed in claim 1, wherein the circuitry is configured to include into the first data unit one or more of:

pilot sequences that are orthogonal to the pilot sequences included by the second communication device into the second data unit a pilot sequence for all streams within a training field of the first data unit, which pilot sequence is orthogonal to the pilot sequence for all streams within the training field of the second data unit, and pilot sequences within a data portion of the first data unit that are identical to pilot sequences included in the second data unit.

12. The first communication device as claimed in claim 10, wherein the circuitry is configured to transmit, as part of the first configuration information, an indication:

whether orthogonal estimation sequences and/or orthogonal pilot sequences are used, which estimation sequences have been selected from the projection matrix, and/or which pilot sequences are used.

13. The first communication device as claimed in claim 1, wherein the circuitry is configured to transmit the preamble of the first data unit and the payload of the first data unit using different beamforming weights.

14. The first communication device as claimed in claim 13, wherein the preamble beamforming weights are configured to reduce or minimize interference towards the one or more fourth communication devices connected to the second communication device and the payload beamforming weights are configured to reduce or minimize interference towards the fourth communication device to which the second communication device transmits the second data unit and/or to improve a communication link with the third communication device, towards which the first data unit is sent.

15. A second communication device configured to communicate with one or more fourth communication devices, the second communication device comprising circuitry configured to:

receive first configuration information from a first communication device that is configured to communicate with one or more third communication devices, the first configuration information including first beamforming configuration information and first time information indicating a duration of an intended transmission of one or more data units, to which the first configuration information applies to the one or more third communication devices, from the first communication device to the one or more third communication devices or the first configuration information further including the maximum duration of simultaneous transmissions of data units by the first communication device and the second communication device;

transmit second configuration information including second beamforming configuration information and second time information indicating the duration of the intended transmission of one or more data units, to which the second configuration information applies to the one or more fourth communication devices, to the one or more fourth communication devices; and communicate with the one or more fourth communication devices using the second configuration information and considering the first configuration information using coordinated beamforming, wherein the second communication device transmits a second data unit, comprising a preamble and a payload, to a fourth communication device of the one or more fourth communication devices, wherein beamforming weights are used for transmitting both the preamble and the payload of the second data unit that reduce or minimize interference towards a third communication device of the one or more third communication devices to which the first communication device transmits a first data unit at least partly overlapping in time with the transmission of the second data unit from the second communication device to the fourth communication device of the one or more fourth communication devices.

16. A third communication device configured to communicate with a first communication device, the third communication device comprising circuitry configured to:

receive first configuration information including first beamforming configuration information and first time information indicating duration of an intended transmission of one or more data units, to which the first configuration information applies to the third communication device, from the first communication device to the third communication device and/or the first configuration information further including the maximum duration of simultaneous transmissions of data units by the first communication device and a second communication device that is configured to communicate with one or more fourth communication devices;

communicate with the first communication device, wherein the third communication device receives a first data unit, comprising a preamble and a payload, transmitted from the first communication device, wherein beamforming weights are used for transmitting both the preamble and the payload of the first data unit; and decode the received first data unit using the first configuration information.

17. A first communication method of a first communication device that is configured to communicate with one or more third communication devices, the first communication method comprising:

transmitting first configuration information including first beamforming configuration information and first time information indicating duration of an intended transmission of one or more data units, to which the first configuration information applies to the one or more third communication devices, from the first communication device to the one or more third communication devices and the first configuration information further including the maximum duration of simultaneous transmissions of data units by the first communication device and a second communication device that is configured to communicate with one or more fourth communication devices;

listening for reception of second configuration information from the second communication device, the second configuration information including second beamforming configuration information and second time information indicating the duration of an intended transmission of one or more data units, to which the second configuration information applies to the one or more fourth communication devices, to the one or more fourth communication devices; and communicating with the one or more third communication devices using the first configuration information and, if received, considering the second configuration information using coordinated beamforming, wherein the first communication device transmits a first data unit, comprising a preamble and a payload, to a third communication device of the one or more third communication devices, wherein beamforming weights are used for transmitting both the preamble and the payload of the first data unit that reduce or minimize interference towards a fourth communication device of the one or more fourth communication devices.

18. A second communication method of a second communication device configured to communicate with one or more fourth communication devices, the second communication method comprising:

receiving first configuration information from a first communication device that is configured to communicate with one or more third communication devices, the first configuration information including first beamforming configuration information and first time information indicating duration of an intended transmission of one or more data units, to which the first configuration information applies to the one or more third communication devices, from the first communication device to the one or more third communication devices or the first configuration information further including the maximum duration of simultaneous transmissions of data units by the first communication device and the second communication device;

transmitting second configuration information including second beamforming configuration information and second time information indicating the duration of an intended transmission of one or more data units, to which the second configuration information applies to the one or more fourth communication devices, to the one or more fourth communication devices; and communicating with the one or more fourth communication devices using the second configuration information and considering the first configuration information using coordinated beamforming, wherein the second communication device transmits a second data unit, comprising a preamble and a payload, to a fourth communication device of the one or more fourth communication devices, wherein beamforming weights are used for transmitting both the preamble and the payload of the second data unit that reduce or minimize interference towards a third communication device of the one or more third communication devices to which the first communication device transmits a first data unit at least partly overlapping in time with the transmission of the second data unit from the second communication device to the fourth communication device of the one or more fourth communication devices.

19. A third communication method of a third communication device configured to communicate with a first communication device, the third communication method comprising:

receiving first configuration information including first beamforming configuration information and first time information indicating duration of an intended transmission of one or more data units, to which the first configuration information applies to the one or more third communication devices, from the first communication device to the third communication device and/or the first configuration information further including the maximum duration of simultaneous transmissions of data units by the first communication device and a second communication device that is configured to communicate with one or more fourth communication devices;

communicating with the first communication device, wherein the third communication device receives a first data unit, comprising a preamble and a payload, transmitted from the first communication device, wherein beamforming weights are used for transmitting both the preamble and the payload of the first data unit; and decoding the received first data unit using the first configuration information.

20. A non-transitory computer-readable recording medium that stores therein a computer program product, which, when executed by a processor, causes the method according to claim 17, 18, or 19 to be performed.

* * * * *